United States Patent
Kondo et al.

(10) Patent No.: US 6,606,111 B1
(45) Date of Patent: Aug. 12, 2003

(54) COMMUNICATION APPARATUS AND METHOD THEREOF

(75) Inventors: Tetsujiro Kondo, Tokyo (JP); Tomoyuki Ohtsuki, Saitama (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/555,556

(22) PCT Filed: Oct. 8, 1999

(86) PCT No.: PCT/JP99/05587

§ 371 (c)(1),
(2), (4) Date: May 31, 2000

(87) PCT Pub. No.: WO00/22823

PCT Pub. Date: Apr. 20, 2000

(30) Foreign Application Priority Data

Oct. 9, 1998 (JP) ............................................ P10-287506

(51) Int. Cl.⁷ ................................................ H04N 7/14
(52) U.S. Cl. ................................ 348/14.01; 348/14.08; 348/14.09
(58) Field of Search ........................... 348/14.01, 14.02, 348/14.03, 14.04, 14.05, 14.06, 14.07, 14.08, 14.09, 14.11, 14.1, 14.12, 14.16; 382/103, 118

(56) References Cited

U.S. PATENT DOCUMENTS 6,037,970 A    3/2000   Kondo ......................... 348/15

FOREIGN PATENT DOCUMENTS

| JP | 1-141479 | 6/1989 | ............ H04N/7/12 |
| JP | 1-289388 | 11/1989 | ............ H04N/7/14 |
| JP | 1-289389 | 11/1989 | ............ H04N/7/14 |
| JP | 4-205617 | 7/1992 | ............ G06F/3/02 |
| JP | 7-30877 | 1/1995 | ............ H04N/7/15 |
| JP | 7-162532 | 6/1995 | ............ H04M/3/56 |
| JP | 9-275533 | 10/1997 | ............ H04N/5/60 |
| JP | 9-319296 | 12/1997 | ........... G09B/21/00 |
| JP | 10-56626 | 2/1998 | ............ H04N/7/15 |
| JP | 10-136339 | 5/1998 | .......... H04N/7/173 |

Primary Examiner—Melur Ramakrishnaiah
(74) Attorney, Agent, or Firm—Bell, Boyd & Lloyd LLC

(57) ABSTRACT

A direction detector section detects an eye direction or face direction of a conference attendant from image data picked up by a camera, and supplies information to an attention level detector section. Based on the information supplied from the direction detector section, the attention level detector section operates information (parameter) of a attention level to adjust sound data and/or image data of the other conference attendants inputted from the other remote conference apparatuses. An adjusting section adjusts corresponding sound data and/or image data by using information of the attention level supplied from the attention level detector section, and the data are outputted as sound from loudspeakers and displayed on monitor sections. In this manner, speech of each of the conference attendants can be heard easily and an image of each conference attendant can be watched easily.

34 Claims, 28 Drawing Sheets

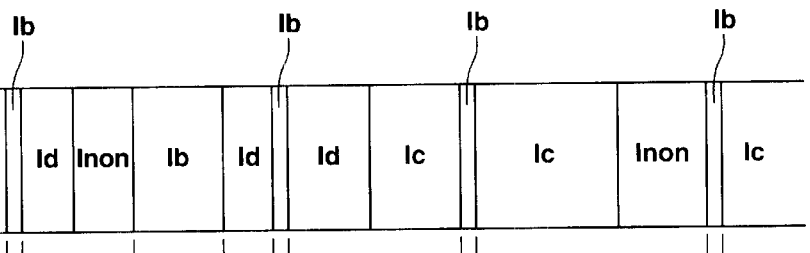
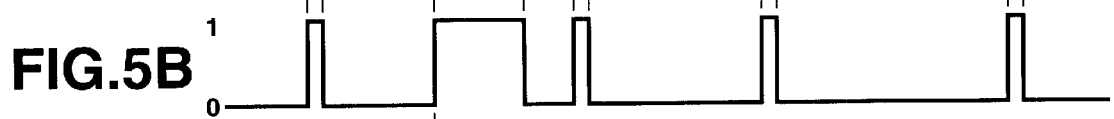
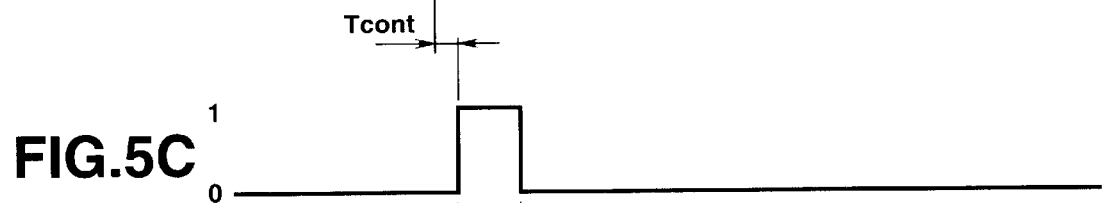
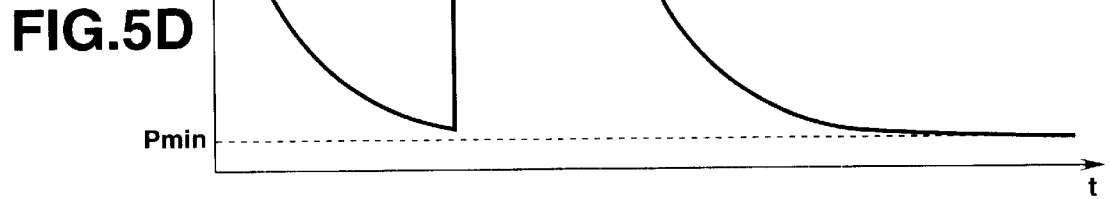

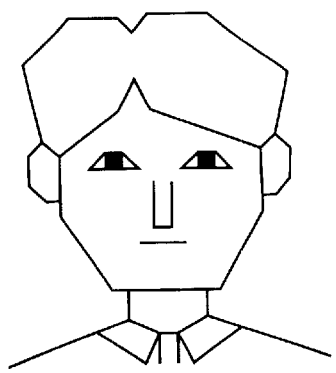
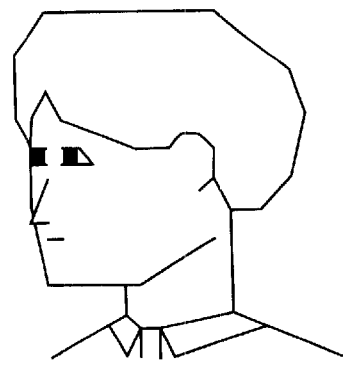
FIG.15A  FIG.15B
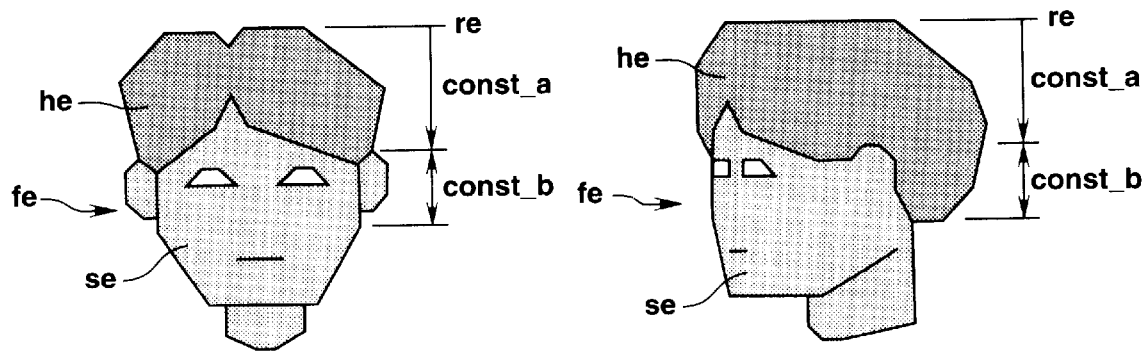
FIG.16A  FIG.16B
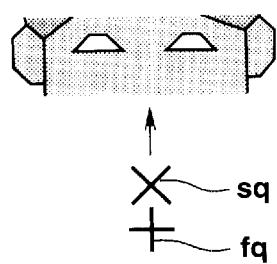
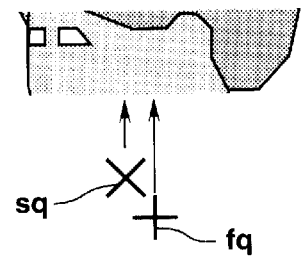
FIG.17A  FIG.17B

COMMUNICATION APPARATUS AND METHOD THEREOF

TECHNICAL FIELD

The present invention relates to a communication apparatus and a method thereof and particularly to a communication apparatus and a method thereof in which sound volume, sound quality, image quality, and the like are adjusted in correspondence with an eye direction and a face direction of a user.

BACKGROUND ART

In a conventional remote conference system, images and sounds are mutually communicated between a plurality of conference rooms through a network, and images and sounds in the conference rooms are reproduced in the other conference rooms, so that a conference can be held as if attendants sat around one table.

Also, in a conventional remote conference system, attendants in conference rooms are able to speak simultaneously. Hence, when a plurality of attendants speak simultaneously, a conventional remote conference system causes a problem that a speech which is desired to hear is disturbed by other speeches and is difficult to hear.

Also, in a conventional remote conference system, all images of respective conference rooms are arranged to have equal brightness and quality. Consequently, it is not possible, for example, to watch an image of a desired conference room brightened more or in more details.

The present invention has been made on the basis of the situation described above and has an object of providing a communication apparatus and a method thereof by which, for example, a desired speech can be heard easily and an image of a desired conference room can be watched also easily.

DISCLOSURE OF THE INVENTION

A communication apparatus according to the present invention is used in a communication system in which communication is made between three or more communication apparatuses, and is characterized by comprising: a direction detector section for detecting a direction in which a user faces among a plurality of directions, where the directions respectively correspond to other ones of the communication apparatuses; an attention level detector section for detecting attention levels at which the user faces in the plurality of directions, respectively, based on a detection result from the direction detector section; a receiver section for receiving information from the other ones of the communication apparatuses; and an adjusting section for adjusting information from the other ones of the communication apparatuses in correspondence with the attention levels.

Here, when the direction detector section keeps detecting one same direction for a first time period or longer, the attention level detector section detects the attention level from the user as being high, with respect to the one same direction detected by the direction detector section.

Also, based on detection of another one of the directions after the direction detector section keeps detecting the one same direction for the first time period or longer, the attention level detector section lowers the attention level.

Also, if a second time period passes from a timing at which the direction detector section detects the another direction, the attention level detector section lowers the attention level.

Also, the attention level detector section gradually lowers the attention level in response to a timing at which the direction detector section detects the another direction.

Also, the attention level detector section lowers the attention level gradually when a second time period passes from the timing when the direction detector section detects the another direction.

Also, the attention level detector section detects the attention level for each of the directions.

Further, the adjusting section adjusts the information, based on the attention levels for the directions, respectively.

Also, the direction detector section detects an eye direction of the user.

Also, the direction detector section detects a face direction of the user.

The adjusting section adjusts information corresponding to the direction in which the attention level is high, such that the information is emphasized relative to other information.

The communication apparatus according to the present invention further comprises a presentation section for presenting the information adjusted by the adjusting section to a user.

Here, the information is sound information and the adjusting section adjusts sound information presented by the presentation section.

The adjusting section adjusts sound volume of the sound information presented by the presentation section.

Also, the adjusting section adjusts sound quality of the sound information presented by the presentation section.

Also, the information is image information and the adjusting section adjusts the image information presented by the presentation section.

The adjusting section adjusts image quality presented by the presentation section.

The presentation section includes a plurality of presentation sections respectively corresponding to the plurality of directions.

The communication apparatus according to the present invention further comprises an obtaining section for obtain formation of the user, and a transmitter section for transmitting the information of the user obtained by the obtaining section to the other communication apparatuses.

Next, a communication method according to the present invention is used for a communication system in which communication is made between three or more communication apparatuses, and is characterized by comprising: a direction detecting step of detecting a direction in which a user faces among a plurality of directions in a state where the plurality of directions respectively correspond to other ones of the communication apparatuses; an attention level detecting step of detecting attention levels at which the user faces in the plurality of directions, respectively, based on a detection result in the direction detecting step; and an adjusting step of adjusting information received from the other ones of the communication apparatuses in correspondence with the attention levels.

Here, in the attention level detecting step, when one same direction is kept detected for a first time period or longer, the attention level from the user is detected as being high, with respect to the detected one same direction.

Also, in the attention level detecting step, based on detection of another one of the directions after the one same direction is kept detected for the first time period or longer, the attention level is lowered.

Also, in the attention level detecting step, if a second time period passes from a timing at which the another direction is detected, the attention level is lowered.

Also, in the direction detecting step, the attention level is gradually lowered in response to a timing at which the another direction is detected.

Also, in the attention level detecting step, the attention level is gradually lowered if a second time period passes from the timing when the another direction is detected in the direction detecting step.

Also, in the attention level detecting step, the attention level is detected for each of the directions.

Further, in the adjusting step, the information is adjusted, based on the attention levels for the directions, respectively.

Also, in the direction detecting step, an eye of the user is detected.

Also, in the direction detecting step, a face direction of the user is detected.

In the adjusting step, information corresponding to the direction in which the attention level is high is adjusted to be emphasized relative to other information.

The communication method according to the present invention further comprises a presentation step of presenting the information adjusted in the adjusting step to a user.

Also, in the adjusting step, sound information presented in the presentation step is adjusted.

Also, in the adjusting step, sound volume of sound information presented in the presentation step is adjusted.

Also, in the adjusting step, sound quality of sound information presented in the presentation step is adjusted.

Here, the information is image information, and in the adjusting step, image information presented in the presentation step is adjusted.

In the adjusting step, image quality of the image information presented in the presentation step is adjusted.

Also, the presentation step includes a step of performing a plurality of presentations respectively corresponding to the plurality of directions.

The communication method according to the present invention further comprises an obtaining step of obtaining formation of the user, and a transmitting step of transmitting the information of the user obtained in the obtaining step to the other communication apparatuses.

BRIEF DESCRIPTION OF THE DRAWINGS

FIGS. 5A to 5D are timing charts used for explaining the processing operation of a direction detector section, an attention level detector section, and an adjusting section in a remote conference apparatus.

FIGS. 15A and 15B are views showing original images in face direction detection.

FIGS. 16A and 16B are views used for explaining a hair area and a skin area in face direction detection.

FIGS. 17A and 17B are views used for explaining barycenters of a hair area and a skin area.

BEST MODE FOR CARRYING OUT THE INVENTION

A preferable embodiment of the present invention will be explained below with reference to the drawings.

Figure 1:
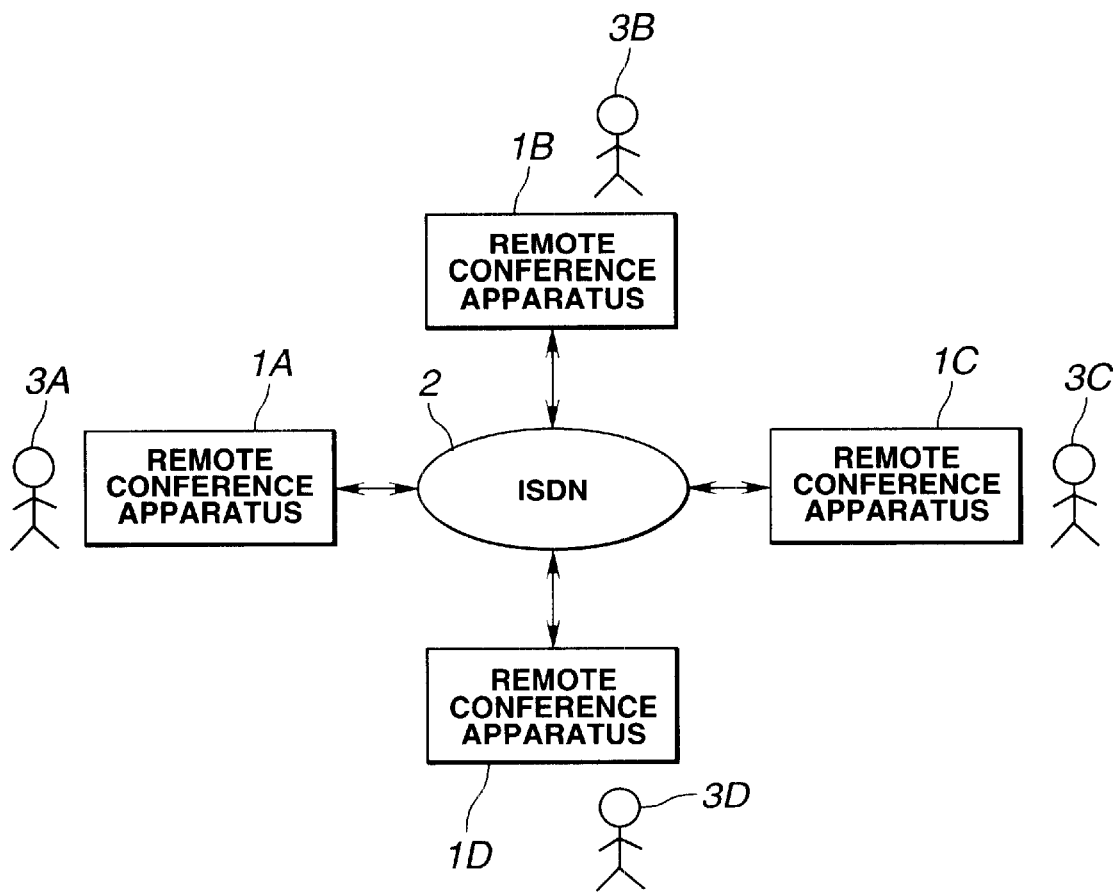
FIG. 1 is a block diagram showing a structural example of a remote conference system to which the present invention is applied.

FIG. 1 shows a schematic structure of a remote conference system as an example to which a communication apparatus and a method thereof according to the present invention are applied. In the present specification, a system means a total structure based on a plurality of apparatuses and sections.

In the remote conference system shown in FIG. 1, a plurality of remote conference apparatuses 1A to 1D (which will be simply described as remote conference apparatuses 1 hereinafter where it is not necessary to distinguish the remote conference apparatuses 1A to 1D from each other) are connected through ISDN (Integrated Services Digital Network) 2, for example. In a remote conference apparatus 1, image data and sound data of conference attendants 3 which are taken in by the remote conference apparatus 1 can be mutually communicated to other remote conference apparatuses 1 through ISDN 2, and image data and sound data transmitted from other remote conference apparatuses 1 can be reproduced.

Although four remote conference apparatuses 1A to 1D are shown to simplify illustration of FIG. 1, it is also possible to connect further more remote conference apparatuses. ISDN 2 is given merely as an example of a communication network, and another transmission medium such as a cable television network, Internet, digital satellite communication, or the like can be used in place of the ISDN 2.

Figure 2:
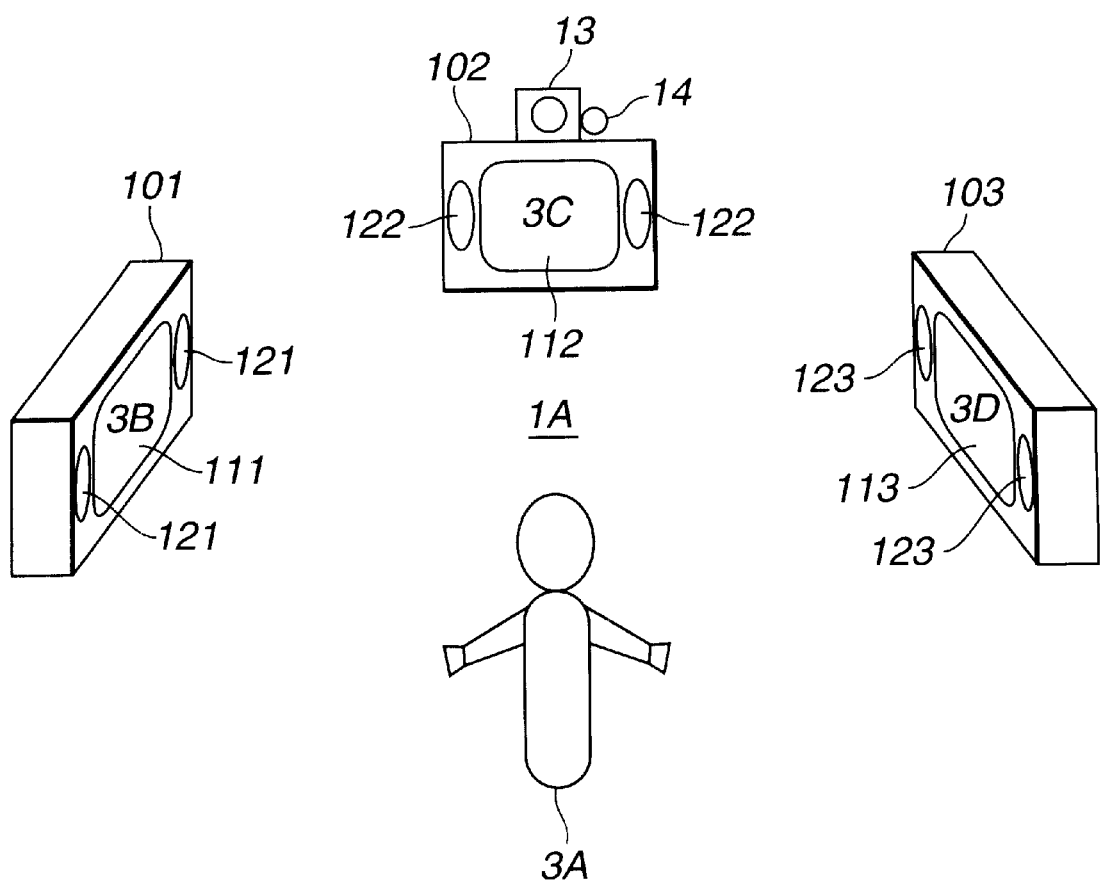
FIG. 2 is a block diagram showing a structural example of one of remote conference apparatuses constructing a remote conference system.

Each of the remote conference apparatuses 1A to 1D that construct the remote conference system has a structure as shown in FIG. 2. FIG. 2 shows a detailed structural example of the remote conference apparatus 1A among the remote conference apparatuses 1A to 1D, for example. The structures of the remote conference apparatuses 1B, 1C and 1D are the same as that of the remote conference apparatus 1A, and explanation thereof will therefore be omitted herefrom.

The remote conference apparatus 1A is constructed by at least a reproduction device 101 which reproduces image data and sound data of a conference attendant 3B transmitted from the remote conference apparatus 1B, a reproduction device 102 which reproduces image data and sound data of a conference attendant 3C transmitted from the remote conference apparatus 1C, and a reproduction device 103 which reproduces image data and sound data of a conference attendant 3D transmitted from the remote conference apparatus 1D. These reproduction devices 101, 102, and 103 are provided as if the conference attendant 3A and the other conference attendants 3B, 3C, and 3D sat around one table and had a conference.

A monitor section 111 of the reproduction device 101 displays image data (image data of the conference attendant 3B and the periphery of the attendant) transmitted from the remote conference apparatus 1B, and a loudspeaker 121 reproduces sound data (speech of the conference attendant 3B) transmitted from the remote conference apparatus 1B. A monitor section 112 of the reproduction device 102 displays image data (image data of the conference attendant 3C and the periphery of this attendant) transmitted from the remote conference apparatus 1C, and a loudspeaker 122 reproduces sound data (speech of the conference attendant 3C) transmitted from the remote conference apparatus 1C. Likewise, a monitor section 113 of the reproduction device 103 displays image data (image data of the conference attendant 3D and the periphery of this attendant) transmitted from the remote conference apparatus 1C, and a loudspeaker 123 reproduces sound data (speech of the conference attendant 3D) transmitted from the remote conference apparatus 1D.

A camera 13 which picks up the image of the conference attendant 3A and a microphone 14 which collects the sound of speech of the conference attendant 3A are provided above the reproduction device (reproduction device 102 in the example of FIG. 2) placed in front of the conference attendant 3A. The image data which the camera 13 picks up and the sound data which the microphone 14 collects are transmitted to the remote conference apparatuses 1B, 1C, and 1D through ISDN 2.

Figure 3:
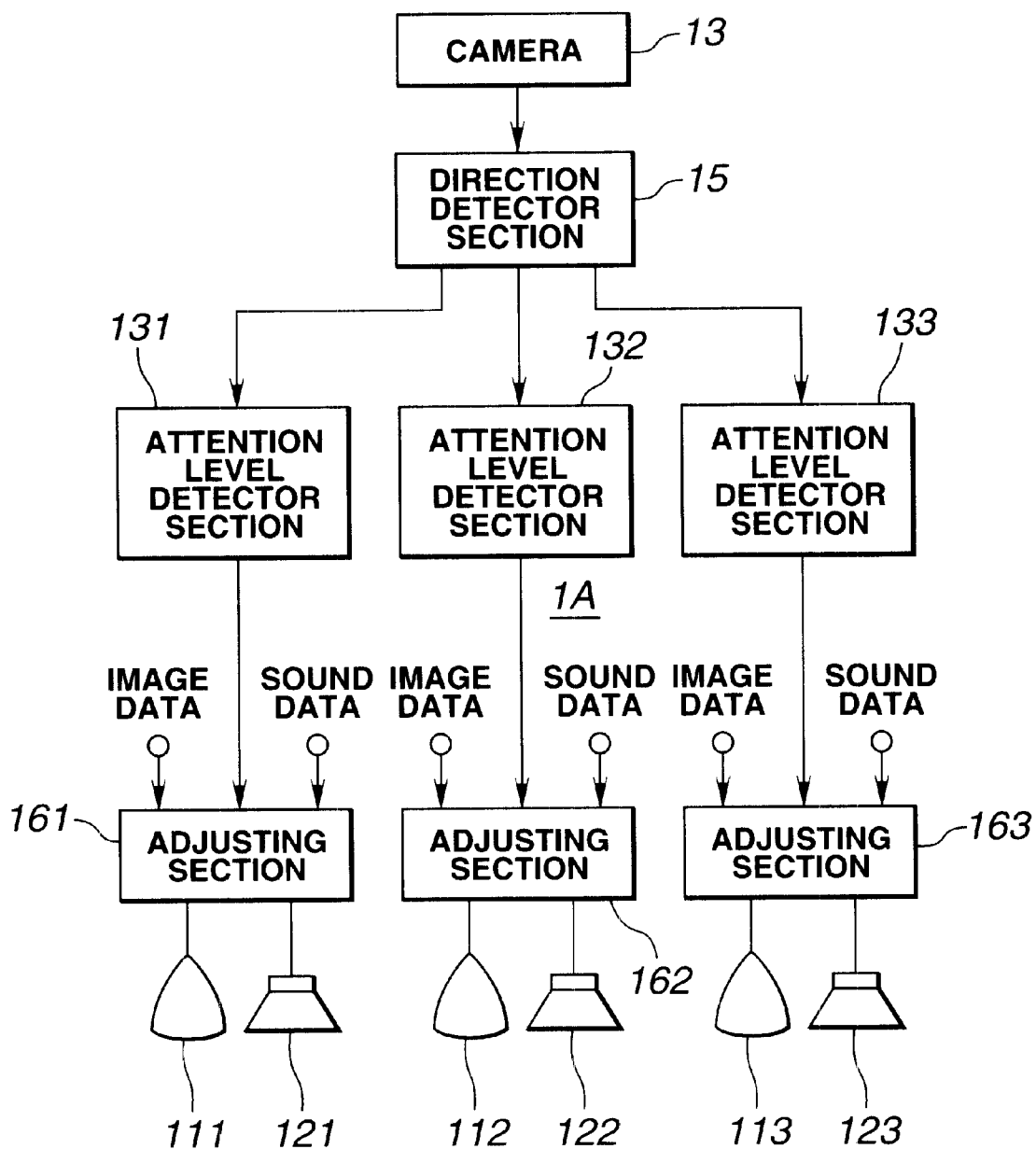
FIG. 3 is a block diagram showing a structural example of a main part of a remote conference apparatus.

The remote conference apparatus 1A comprises components shown in FIG. 3 as a structure of its main part. A specific structure and layout of components of the remote conference apparatus 1A including the components of the main part shown in FIG. 3 are arranged as shown in FIG. 4.

Figure 4:
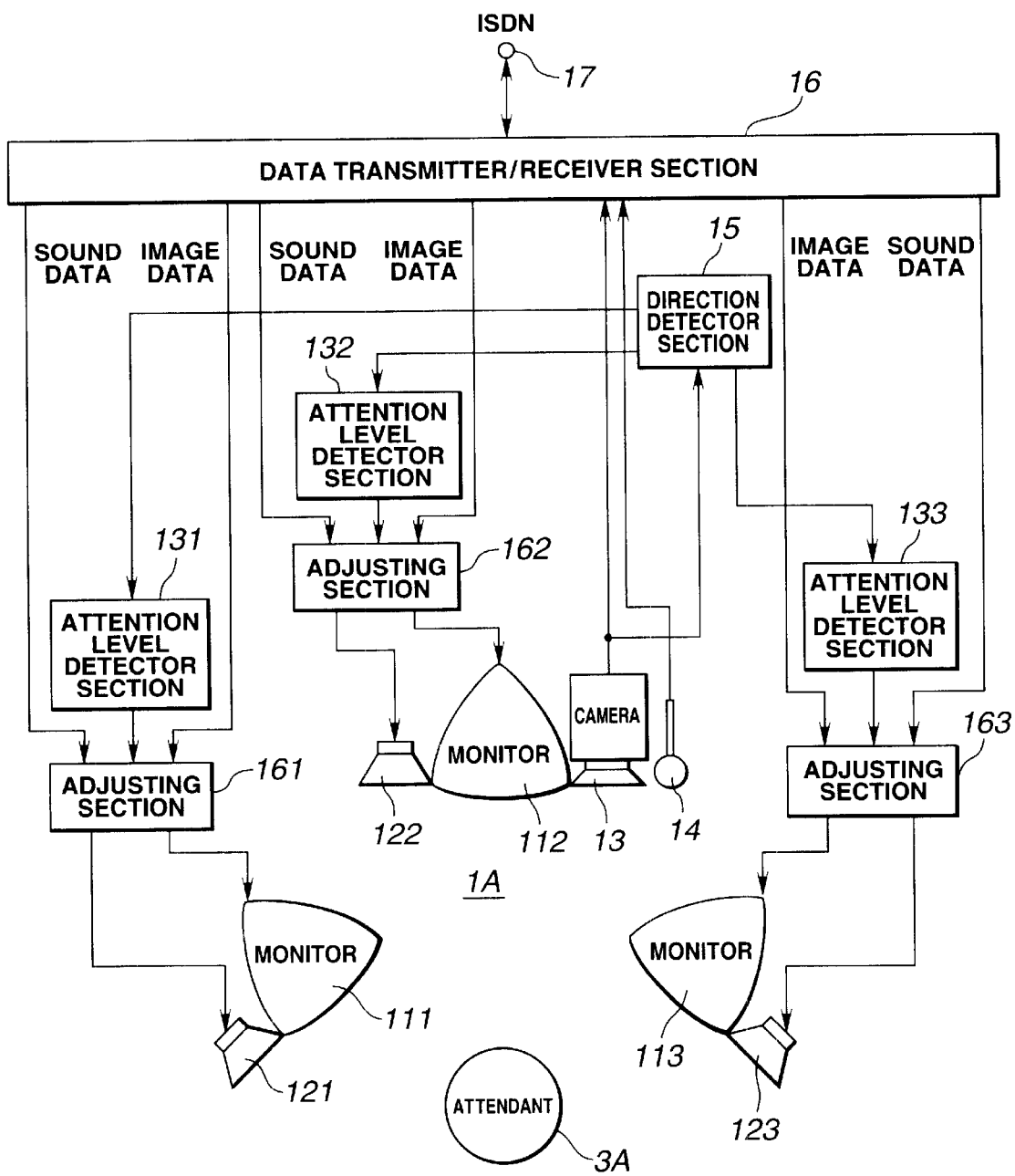
FIG. 4 is a block diagram showing a specific structural example of a main part of a remote conference apparatus.

In FIGS. 3 and 4, if a plurality of directions viewed from the conference attendant 3A respectively correspond to the remote conference apparatus 1B, 1C, and 1D, the remote conference apparatus 1A comprises a direction detector section 15 for detecting a direction in which the conference attendant 3A faces, attention level detector sections 131, 132, and 133 for detecting respectively attention levels of the conference attendant 3A with respect to the directions, based on a result detected by the direction detector section 15, an ISDN connection terminal 17 and a data transmitter/receiver 16 which receive image data and sound data from the other remote conference apparatuses 1B, 1C, and 1D, and adjusting sections 161, 162, and 163 which adjust image data and/or sound data transmitted from the other remote conference apparatuses 1B, 1C, and 1D in correspondence with the attention levels. The attention level detector sections 131, 132, and 133, as well as the adjusting sections 161, 162, and 163 arranged in rear stages thereof, are respectively provided in correspondence with the reproduction devices 101, 102, and 103. Details and a specific example of the directions and the attention levels mentioned above will be described later.

The direction detector section 15 analyzes image data of the conference attendant 3A supplied from the camera 13, detects the direction in which the conference attendant 3A faces at a certain sampling rate, and supplies a detection result to the attention level detector sections 131, 132, and 133.

That is, as shown in FIG. 5A, the direction detector section 15 detects a period Ib for which the conference attendant 3A faces to the monitor section 111 on which the conference attendant 3B is displayed, a period Ic for which the conference attendant 3A faces to the monitor section 112 on which the conference attendant 3C is displayed, a period Id for which the conference attendant 3A faces to the monitor section 113 on which the conference attendant 3D is displayed, and a period Inon for which the conference attendant 3A faces to none of the monitor sections 111 to 113, as information representing the direction in which the conference attendant 3A faces and the duration time for which the attendant keeps the direction.

Next, the direction detector section 15 generates a signal obtained by extracting only the period Ib for which the conference attendant 3A faces the monitor section 111 among the detected periods Ib, Ic, Id, and Inon as is shown in FIG. 5B, and supplies the signal to the attention level detector section 131. Likewise, the direction detector section 15 generates a signal obtained by extracting only the period Ic for which the conference attendant 3A faces to the monitor section 112 among detected periods Ib, Ic, Id, and Inon, and supplies the signal to the attention level detector section 132, as well as the direction detector section 15 generates a signal obtained by extracting only the period Id for which the conference attendant 3A faces to the monitor section 113 among the detected periods Ib, Ic, Id, and Inon, and supplies the signal to the attention level detector section 133.

The attention level detector section 131 determines whether or not there is a period Ib which particularly continues for a time Tcont or longer among periods Ib, based on the signal supplied from the direction detector section 15. If a period Ib continues for the Tcont or longer, as shown in FIG. 5C, the attention level detector section 131 detects the time which exceeds the time Tcont, as a time for which the conference attendant 3A faces particularly to the monitor section 111 on which the conference attendant 3B is displayed. Further, if the attention level detector section 131 detects the time for which the conference attendant 3A faces to the monitor section 111, as shown in FIG. 5D, the attention level detector section 131 obtains a parameter P(t) as an attention level used for adjustment which is made by the adjusting section 161 on the image data and/or the sound data of the conference attendant 3B transmitted from the remote conference apparatus 1B, based on the timing at which the time is detected.

Specifically, the attention level detector section 131 obtains the parameter P(t) at the time point t by an operation using the expression (1) below.

$$P(t) = (1 - P\min) A^{-\alpha(t)} + P\min \quad (1)$$

The minimum parameter Pmin and the constant A in the expression (1), and the time Tatt and the time Tcont shown in FIG. 5 are constants that satisfy the expressions (2) to (5) below.

$$0 \leq P\min \leq 1 \quad (2)$$

$$A > 1 \quad (3)$$

$$T\text{att} \geq 0 \quad (4)$$

$$T\text{cont} \geq 0 \quad (5)$$

If a variable $\beta(t) = t -$ (where t is the time point when the conference attendant 3A last faced to the monitor section 111) is defined, the value of the variable $\alpha(t)$ is 0 where $\beta(t) < T\text{att}$ is given, and the value of the variable $\alpha(t)$ is $\beta(t) - T\text{att}$ where $\beta(t) \geq T\text{att}$ is given. The definition that the conference attendant 3A faces to the monitor section 111 at the time point t means that the conference attendant 3A faces in a direction toward the monitor section 111 from the time point (t−Tcont) to the time point t.

That is, if the time Tcont passes in a state where the conference attendant 3A keeps facing to the monitor section 111, the attention level detector section 131 determines that the conference attendant 3A pays particular attention to the monitor section 111, and the parameter P(t) is set to the maximum value (=1), as indicated in FIG. 5 and by the expression (1). Thereafter, if the direction in which the conference attendant 3A faces turns away from the monitor section 111, the attention level detector section 131 maintains the parameter P(t) at the maximum value from the time point when the direction turns away to the time point when Tatt passes. After the time Tatt passes, the attention level detector section 131 changes the parameter P(t) so as to decrease from the maximum value to the minimum parameter Pmin gradually.

Like in the case of the attention level detector section 131, the attention level detector section 132 determines whether or not there is a period Ic which continues for the time Tcont or longer among periods Ic, based on the signal supplied from the direction detector section 15. If there is a period Ic which continues for the Tcont or longer, the time which exceeds the time Tcont is detected as the time for which the conference attendant 3A particularly pays attention to the monitor section 112 on which the conference attendant 3C is displayed. Further, if the attention level detector section 132 detects the time for which the conference attendant 3A faces to the monitor section 112, the attention level detector section 132 obtains a parameter P(t) as an attention level for adjustment which is made by the adjusting section 162 on the image data and/or the sound data of the conference attendant 3C transmitted from the remote conference apparatus 1C, based on the timing at which the time is detected.

That is, if the time Tcont passes in a state where the conference attendant 3A keeps facing to the monitor section 112, the attention level detector section 132 determines that the conference attendant 3A faces particularly to the monitor section 112, and the parameter P(t) is set to the maximum value (=1). Thereafter, if the direction in which the conference attendant 3A faces turns away from the monitor section 112, the attention level detector section 132 maintains the parameter P(t) at the maximum value from the time point when the direction turns away to the time point when Tatt passes. After the time Tatt passes, the attention level detector section 132 changes the parameter P(t) so as to decrease from the maximum value to a minimum parameter Pmin gradually.

Likewise, the attention level detector section 133 determines whether or not there is a period Id which continues for the time Tcont or longer among periods Id, based on the signal supplied from the direction detector section 15. If there is a period Id which continues for Tcont or longer, the time which exceeds the time Tcont is detected as the time for which the conference attendant 3A faces particularly to the monitor section 113 on which the conference attendant 3D is displayed. Further, if the attention level detector section 133 detects the time for which the conference attendant 3A faces to the monitor section 113, the attention level detector section 133 obtains a parameter P(t) as an attention level for adjustment which is made by the adjusting section 163 on the image data and/or the sound data of the conference attendant 3D transmitted from the remote conference apparatus 1D, on the basis of the timing at which the time is detected.

That is, if the time Tcont passes in a state where the conference attendant 3A keeps facing to the monitor section 113, the attention level detector section 133 determines that the conference attendant 3A faces particularly to the monitor section 113, and the parameter P (t) is set to the maximum value (=1). Thereafter, if the direction in which the conference attendant 3A faces turns away from the monitor section 113, the attention level detector section 133 maintains the parameter P (t) at the maximum value from the time point when the direction turns away to the time point when Tatt passes. After the Time Tatt passes, the attention level detector section 133 changes the parameter P (t) so as to decrease from the maximum value to the minimum parameter Pmin gradually.

Figure 6:
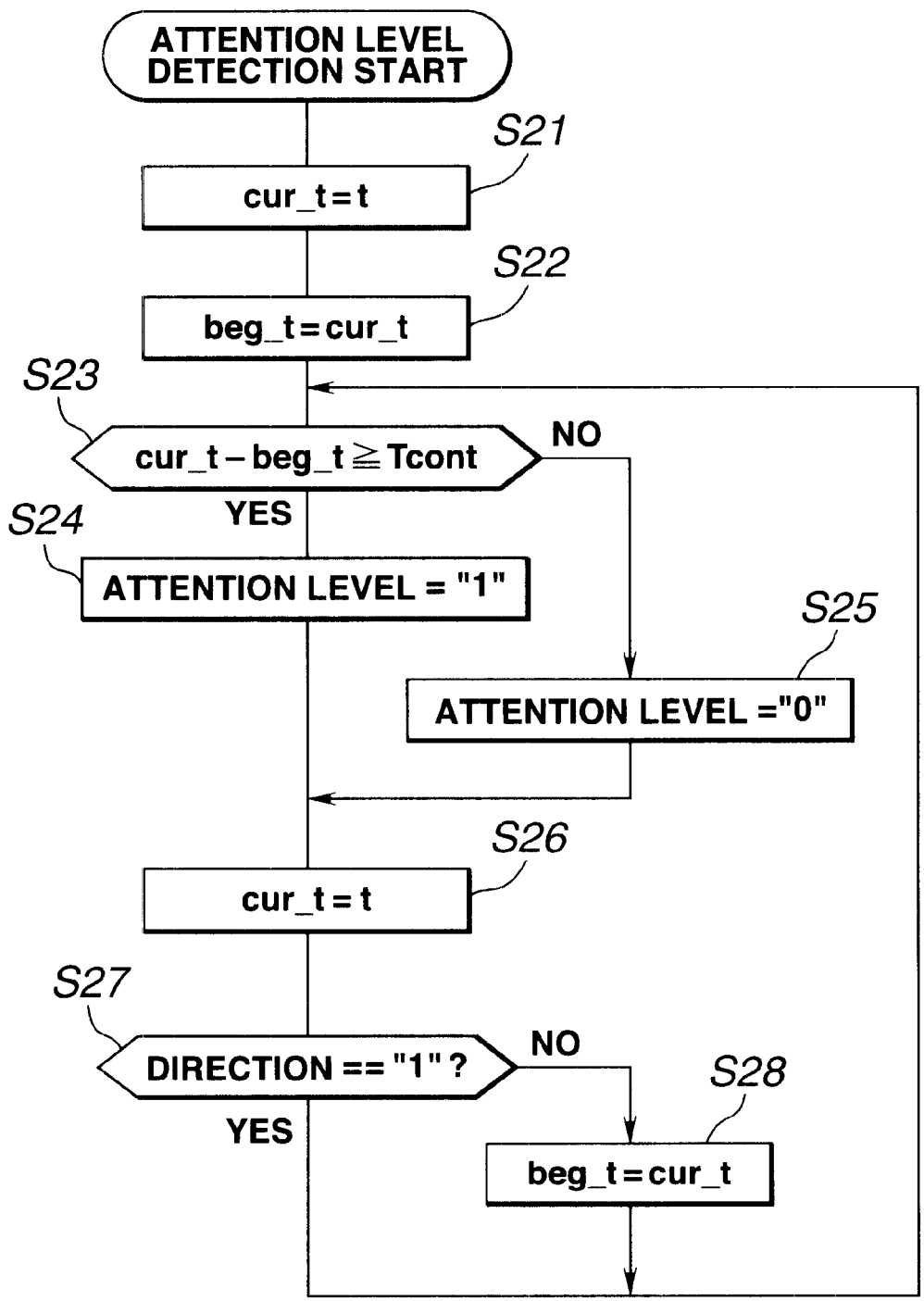
FIG. 6 is a flowchart showing a flow of attention level detection processing.

FIG. 6 shows a flow of processing when the attention level detector sections 131, 132, and 133 respectively detect whether or not the conference attendant 3A faces to the monitor sections 111, 112, and 113, based on the signal supplied from the direction detector section 15. The contents of processing in the attention level detector sections 131, 132, and 133 are equal to each other and will therefore be explained with only the attention level detector section 131 taken as an example.

In FIG. 6, in the attention level detector section 131, the present time t is firstly stored into a variable cur_t, as a step S21, and further, the variable cur_t expressing the present time t is stored into the value of a variable beg_t expressing the time at which the conference attendant 3A comes to face to the monitor section 111, as a step S22. Initialization is thus carried out. After the initialization is carried out, the processing in the attention level detector section 131 goes to a step S23.

The processing thus goes to the step S23, and the attention level detector section 131 then carries out an operation of (cur_t) (beg_t) which expresses how long time has passed since the conference attendant 3A faced to the monitor section 111, and determines whether or not the time obtained by the expression is equal to or longer than the time Tcont. Immediately after the initialization, since values of the variable beg_t and the variable cut_t are equal to each other, (cur_t)-(beg_t)=0 is given, so the attention level detector section 131 determines "No" in the step S23 at this time.

If the attention level detector section 131 determines "No" in the step S23, the attention level detector section 131 sets a value of "0" as shown in FIG. 5C, regarding the conference attendant 3A as not facing to the monitor section 111, as processing in a step S25, and the processing goes to a step S26.

The processing thus goes to the step S26, and the present time t is then stored in the variable cut_t in the attention level detector section 131. The processing goes then to a step S27.

The processing thus goes to the step S27, the attention level detector section 131 then determines whether or not a signal expressing a period Ib supplied from the direction detector section 15 is "1" i.e., whether or not the conference attendant 3A faces to the monitor section 111. If the attention level detector section 131 determines "No" in the step S27, the attention level detector section 131 stores the variable cur_t into the variable beg_t as processing in a step S28 and thereafter returns to the processing in the step S23.

After returning to the process of the step S23, the attention level detector section 131 determines whether or not the time given by the expression (cur_t)-(beg_t) is equal to or longer than the time Tcont. In the processing of the step S23, if the time given by the expression (cur_t)-(beg_t) is equal to or longer than the time Tcont, the processing in the attention level detector section 131 goes to a step S24.

After the proceeding goes to the step S24, the attention level detector section 131 sets a value "1" as shown in FIG. 5C, regarding the conference attendant 3A as facing to the monitor section 111, and goes to the steps from the step 26. The processing from the step S26 is the same as described above.

Figure 7:
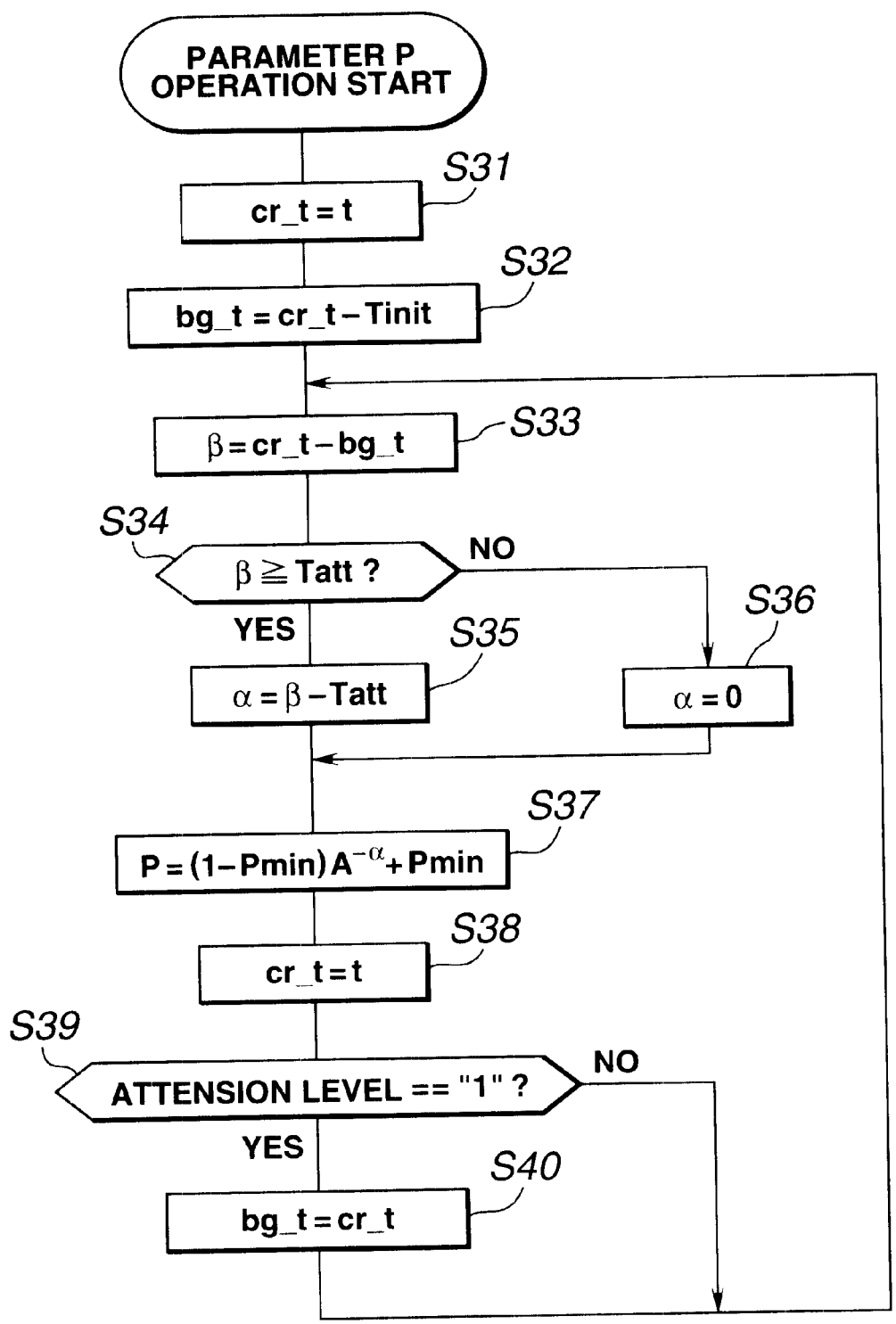
FIG. 7 is a flowchart showing a flow of operation processing of an attention level.

FIG. 7 shows a flow of processing of operating the parameter P (t) in the attention level detector sections 131, 132 and 133. The contents of the processing in the attention level detector sections 131, 132, and 133 are equal to each other, and therefore, explanation will be made only to the attention level detector section 131 as an example.

In FIG. 7, the attention level detector section 131 carries out initialization as follows. The present time t is firstly stored into a variable cr_t, as a step S31, and further, a value of (cur_t−Tinit) is stored into a value of a variable bg_t expressing the time at which the conference attendant 3A comes to face to the monitor section 111, as a step S32. Tinit is an initial value of the variable β which is used when the parameter P is finally operated. After the initialization was completed, the processing in the attention level detector section 131 goes to a step S33.

After the process goes to the step S33, the attention level detector section 131 makes operation of (cur_t)−(beg_t) which expresses how long time has passed since the conference attendant 3A turned to face to the monitor section 111, and stores the value obtained by the operation into the variable β.

Next, the attention level detector section 131 determines whether or not the variable β is equal to or longer than the time Tcont, i.e., whether or not the elapsed time since the conference attendant 3A stopped facing to the monitor section 111 is equal to or longer than the time Tatt. If the attention level detector section 131 determines "No" in the step S34, the attention level detector section 131 stores a value of into the expression (1) as processing in a step S36. Meanwhile, if the attention level detector section 131 determines "Yes" in the step S34, the attention level detector section 131 stores a value of (β-Tatt) into the variable α of the expression (1) as processing of a step S35. After the processing in the steps S35 and S36, the processing in the attention level detector section 131 proceeds to a step S37.

After the process goes to the step S37, the attention level detector section 131 obtains the parameter P by the expression (1), and thereafter stores the present time t into the variable cut_t as processing in a step S38.

Next, the attention level detector section 131 goes to processing in a step S39, and determines whether or not the conference attendant 3A faces to the monitor section 111, i.e., whether or not the signal is "1" as shown in FIG. 5C. If the attention level detector section 131 determines "No" in the step S39, the attention level detector section 131 returns to the processing in the step S33. If the attention level detector section 131 determines "Yes" the attention level detector section 131 returns to the processing in the step S33, after storing the variable cr_t into the variable bg_t, as processing in a step S40. Processing after the step S33 is the same as described above.

Returning to FIGS. 3 and 4, the parameter P (t) outputted from the attention level detector section 131 is transmitted to the adjusting section 161, the parameter P (t) outputted from the attention level detector section 132 is transmitted to the adjusting section 162, and the parameter P (t) outputted from the attention level detector section 133 is transmitted to the adjusting section 163. Image data and sound data transmitted from the remote conference apparatus 1B are supplied to the adjusting section 161 through the data transmitter/receiver 16, image data and sound data transmitted from the remote conference apparatus 1C are supplied to the adjusting section 162 through the data transmitter/receiver 16, and image data and sound data transmitted from the remote conference apparatus 1D are supplied to the adjusting section 163 through the data transmitter/receiver 16.

When the adjusting section 161 receives a parameter P (t) supplied from the attention level detector section 131, the adjusting section 161 adjusts sound data and/or image data of the conference attendant 3B supplied from the remote conference apparatus 1B on the basis of the parameter P (t). Also, when the adjusting section 162 receives a parameter P (t) supplied from the attention level detector section 132, the adjusting section 162 adjusts sound data and/or image data of the conference attendant 3C supplied from the remote conference apparatus 1C on the basis of the parameter P (t). Likewise, when the adjusting section 163 receives a parameter P (t) supplied from the attention level detector section 133, the adjusting section 163 adjusts sound data and/or image data of the conference attendant 3D supplied from the remote conference apparatus 1D on the basis of the parameter P (t). The detail of a specific content of the adjustment in the adjusting sections 161, 162 and 163 will be described below.

The sound signal outputted from the adjusting section 161 is supplied to the loudspeaker 121 and sound is generated. The image signal outputted therefrom is supplied to the monitor section 111 and displayed. Also, the sound signal outputted from the adjusting section 162 is supplied to the loudspeaker 122 and sound is generated. The image signal outputted therefrom is supplied to the monitor section 112 and displayed. Likewise, the sound signal outputted from the adjusting section 163 is transmitted to the loudspeaker 123 and sound is generated. The image signal outputted therefrom is transmitted to the monitor section 113 and displayed.

Explained next will be a specific example of direction detection performed by the direction detector section 15 in the remote conference apparatus 1A according to the present embodiment.

Detection of an eye direction of the conference attendant 3A can be cited as a specific example of the direction detection.

Figure 8:
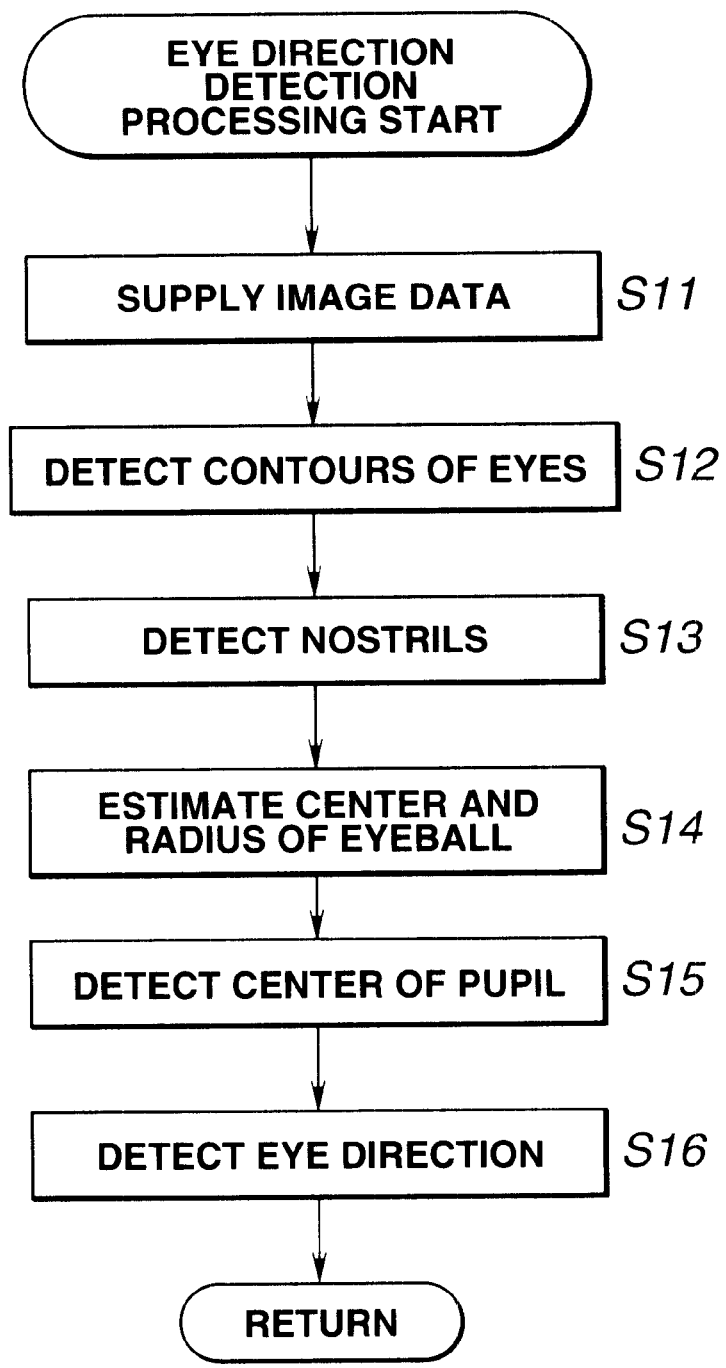
FIG. 8 is a flowchart showing a flow of eye detection processing.

FIG. 8 shows a flow of processing of detecting an eye direction in the direction detector section 15.

Figure 9:
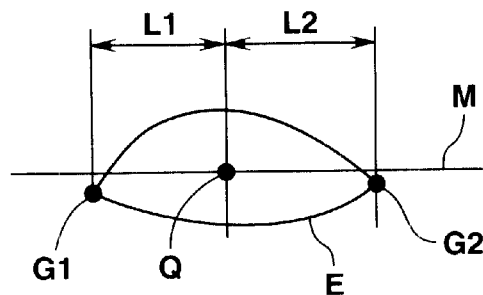
FIG. 9 is a view used for explaining a position detection range of both ends of an eye.

In FIG. 8, if image data picked up by the camera 13 is supplied to the direction detector section 15 in a step S11, the direction detector section 15 detects contours of both eyes by using the color information of the supplied image, as processing in the next step S12. That is, the direction detector section 15 extracts color areas, such as skin, white parts of the eyes, irises, and the like, and obtains, for example, a boundary between the color areas extracted, thereby to detect a contour E of the right eye and a contour E of the left eye, as shown in FIG. 9. FIG. 9 shows only one eye.

Figure 10:
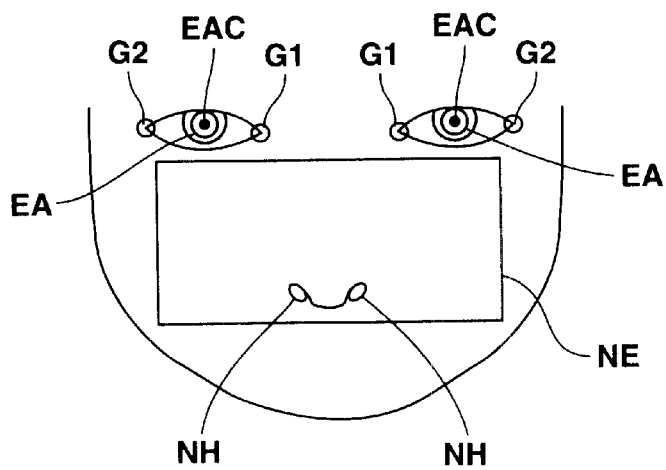
FIG. 10 is a view used for explaining a position detection range of a nostril.

Next, as processing in a step S13, the direction detector section 15 obtains positions of both right and left end points G1 and G2 of the right eye, as well as positions of both right and left end points G1 and G2 of the left eye, based on each contour E obtained in the step S12. With the positions of right and left ends points G1 and G2 of each of the right and left eyes used as references, the direction detector section 15 determines a search range NE to search nostrils shown in FIG. 10 and detects positions of the nostrils NH from the search range NE. That is, with respect to each of the left and right eyes, the direction detector section 15 obtains a barycenter Q of a set of pixels forming the contour E of the eye and a line M which minimizes a secondary moment (the moment concerning the line) of the set of pixels forming the contour E of the eye. Further, from the set of pixels forming the contour E of each eye, the direction detector section 15 obtains pixels at positions which are apart from the barycenter Q by maximum distances L1 and L2 in the left and right directions on the line M, respectively, and these pixel positions are obtained as the left and right end points G1 and G2. Subsequently, as shown in FIG. 10, the direction detector section 15 determines the search range NE to search the nostrils in the lower sides than the left and right end points G1 and G2, with the positions of left and right ends points G1 and G2 of the right and left eyes used as references, which are determined previously. At this time, since the image of the portions of the nostrils NH are picked up to be darker in comparison with the other sections, the direction detector section 15 detects image portion where luminance is low within the search range NE, as positions of the nostrils NH.

Figure 11:
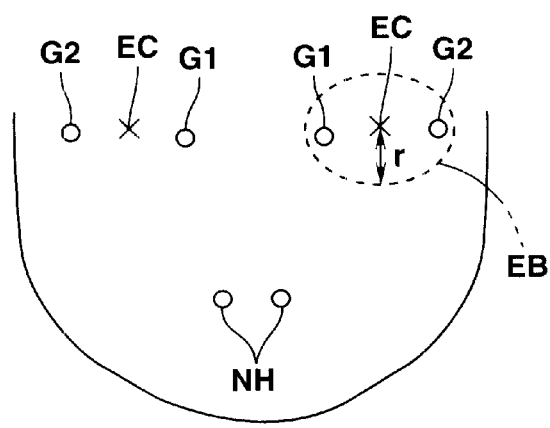
FIG. 11 is a view used for explaining both end positions of eyes, positions of nostril, and center positions of eyeballs.

Next, as shown in FIG. 11, the direction detector section 15 estimates a center position EC of a eyeball EB and a radius r of the eyeball EB on the basis of a geometric positional relationship among the positions of the left and right ends points G1 and G2 of the right eye, the positions of the left and right ends points G1 and G2 of the left eye, and the positions of the nostrils NH, as processing in the step S14.

Further, as shown in FIG. 10, the direction detector section 15 detects center positions EAC of pupils EA by using luminance information of images inside the contours E of right and left eyes as processing in the step S15.

Figure 12:
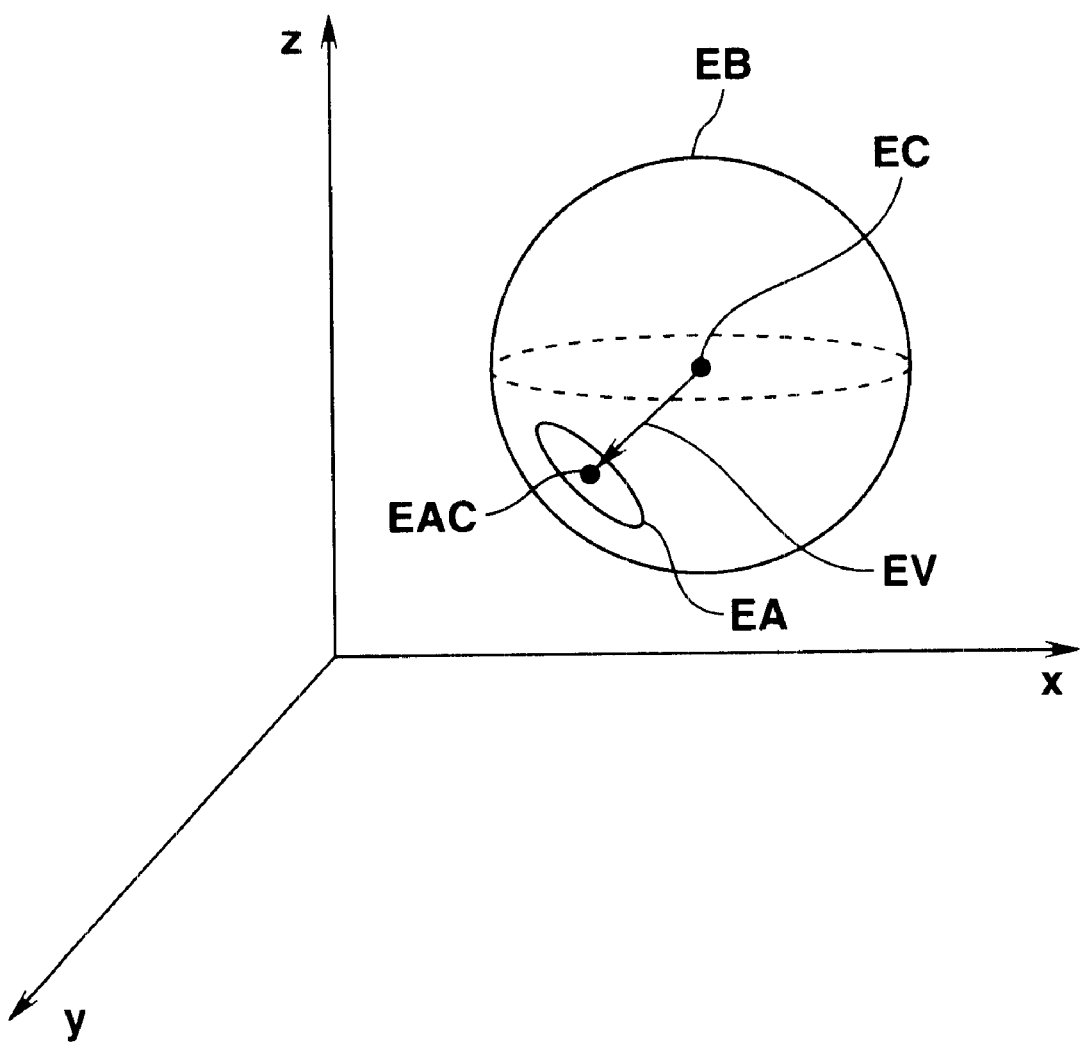
FIG. 12 is a view used for explaining detection of a direction of an eye.

Next, as processing in the step S16 shown in FIG. 12, the direction detector section 15 operates a vector EV that connects the center position EC of the eyeball EB detected in the step S14 with the center position EAC of the pupil EA detected in the step S15, and makes a direction determination, i.e., determines which of the monitor sections 111 to 113 the vector EV is oriented to, with the vector EV taken as an eye direction.

From the flow described above, the direction detector section 15 detects the eye direction of the conference attendant 3A.

The line M which immunizes the secondary moment of a particular set of pixels such as a contour E can be obtained by the following operation, for example.

Figure 13:
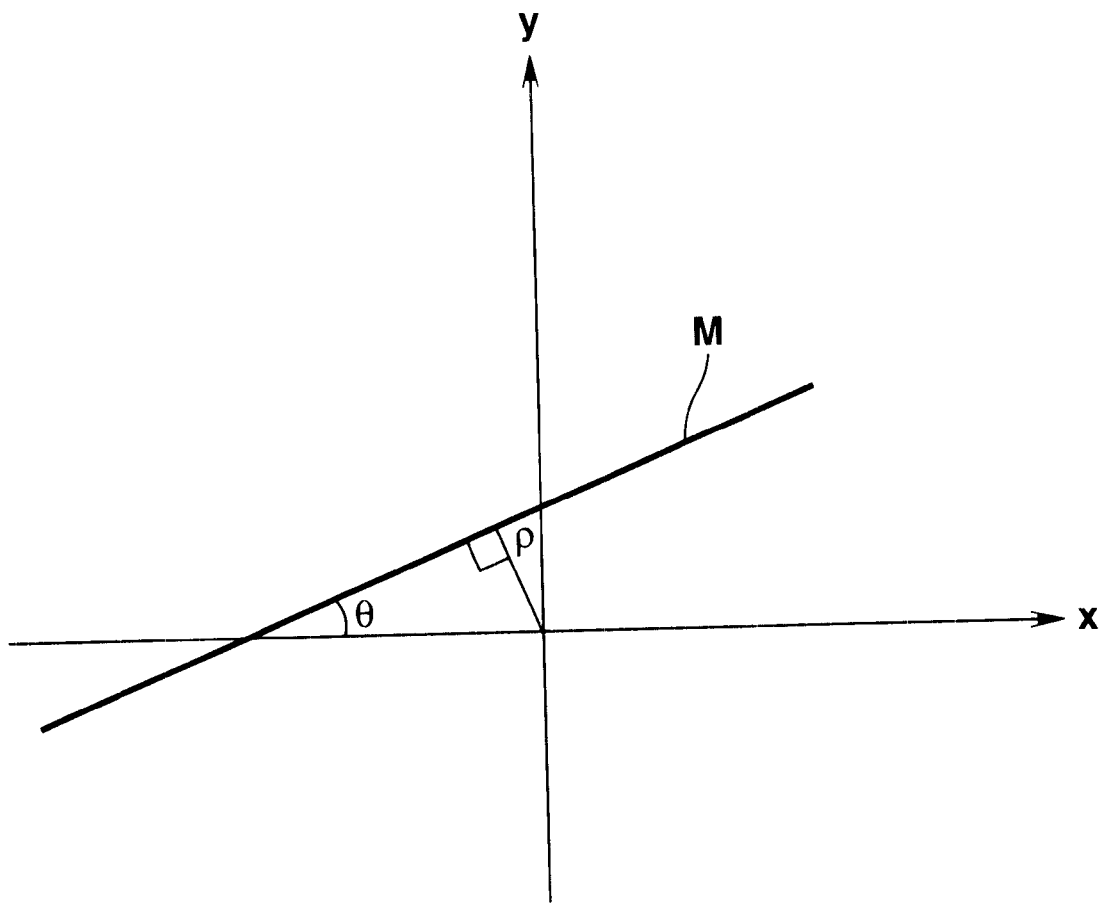
FIG. 13 is a view used for explaining how to obtain a line which minimizes a secondary moment of a set of particular pixels.

Here, the line M expressed by an expression (6) is taken as an example, as shown in FIG. 13.

$$x \sin \theta - y \cos \theta + \rho = 0 \qquad (6)$$

If a distance between each point $(x_i, y_i)$ on the set of pixels of the contour E and the line M is $R_i$, a secondary moment in relating to the line M can be expressed by an expression (7).

$$m = \Sigma_i R_i^2 = \Sigma_i (x_i \sin \theta - y_i \cos \theta + \rho)^2 \qquad (7)$$

That is, the line M that minimizes the secondary moment is the line M that minimizes in of the expression (7). In conclusion, in order to minimize m of the expression (7), values which satisfy the following expressions (8) and (9) are used as $\theta$ and $\rho$ of the expression (7).

$$\theta: \sin 2\theta = b/(b^2 + (a-c)^2)^{1/2}, \cos 2\theta = (a-c)/(b^2 + (a-c)^2)^{1/2} \qquad (8)$$

$$\rho: \rho = -x_0 \sin \theta + y_0 \cos \theta \qquad (9)$$

$(x_0 \sin \theta - y_0 \cos \theta + \rho = 0)$ in the expression (9) means that this passes the barycenter of the set of pixels.

However, in the above expressions (8) and (9), a, b and c are expressed by the following expressions (10), (11) and (12). ($x_0$ $y_0$) expresses the barycenter of the set of pixels.

$$a = \Sigma_i (x_i - x_0)^2 \tag{10}$$

$$b = 2\Sigma_i (x_i - x_0)(y_i - y_0) \tag{11}$$

$$c = \Sigma_i (y_i - y_0)^2 \tag{12}$$

Another example of direction detection carried out in the direction detector section 15 of the remote conference apparatus 1A according to the present embodiment will be detection of the direction of the face of the conference attendant 3A.

Figure 14:
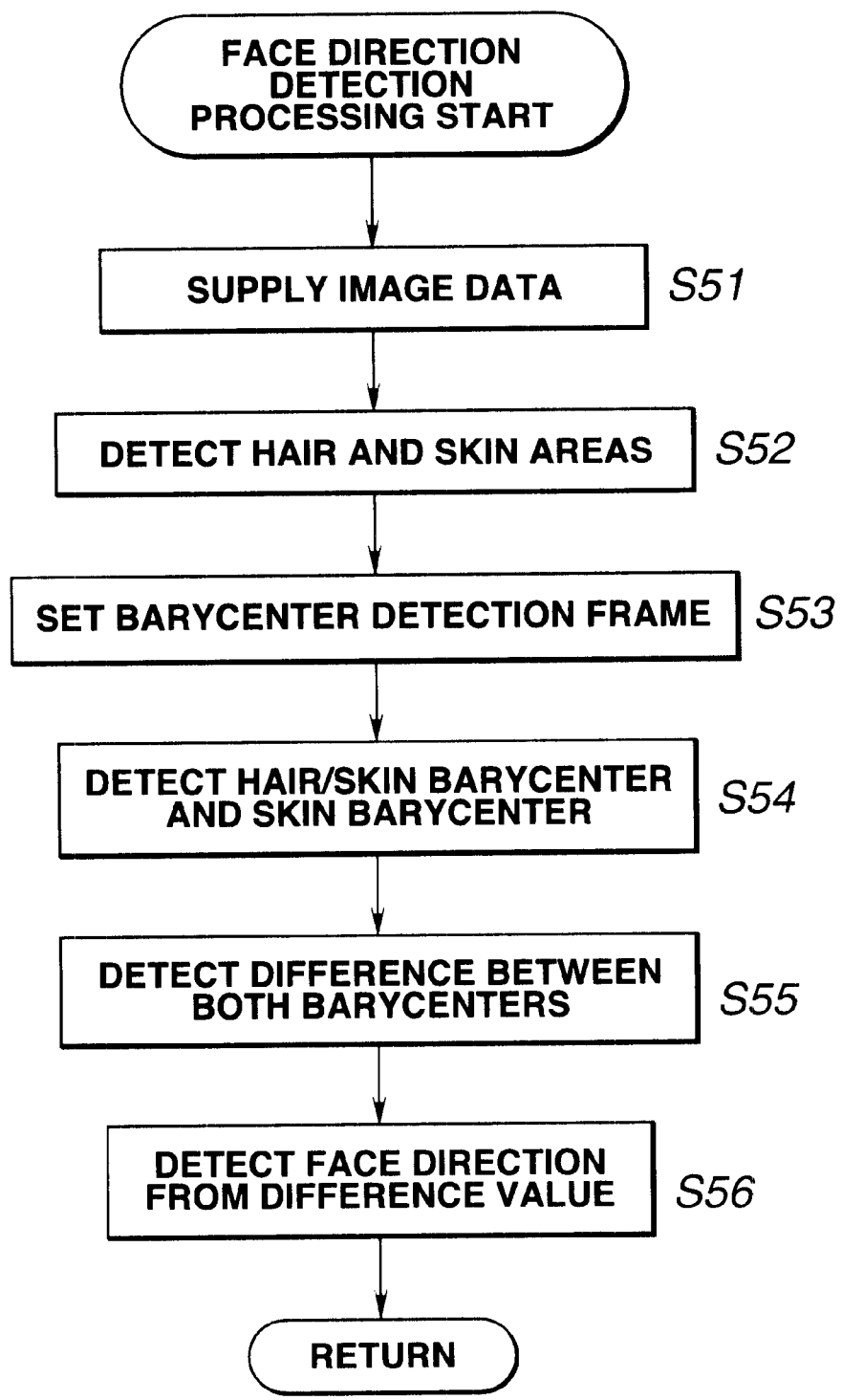
FIG. 14 is a flowchart showing a flow of face direction detection processing.

FIG. 14 shows a flow of processing in case of carrying out the face direction detection by the direction detector section 15.

In FIG. 14, for example, if original image data picked up by the camera 13 as shown in FIGS. 15A and 15B is supplied as processing in a step S51, the direction detector section 15 detects a skin area and a hair area by using color information of the supplied image, as processing of a next step S52. That is, the direction detector section 15 extracts, for example, color areas of skin and hair from color information of the supplied image, and detects a skin area se and a hair area he by the extracted color areas, as shown in FIG. 16A and 16B.

Next, as processing in a step S53, the direction detector section 15 carries out setting of a frame to detect a barycenter fq of a sum area fe of the skin area se and the hair area he (=se+he), and a barycenter sq of the skin area se as, shown in FIGS. 17A and 17B. Here, setting of the frame is carried out by, for example, specifying a range in a vertical direction of the image. More specifically, the specification of the range is carried out, for example, by using the upper end re of the sum area fe of the hair area he and the skin area se used as a reference, such that the range is set from a section const_a in the downward direction from the upper end re to a section const_a+const_b.

Subsequently, as processing in the step S54, the direction detector section 15 obtains a barycenter fq of the sum area fe of the hair area he and skin area se and a barycenter sq of the skin area se within the range of the frame set in the step S53. These barycenters are utilized in case where face direction detection is carried out in both the horizontal and vertical directions or in either the horizontal or vertical direction, in later processing. However, explanation will now be made of a case in which barycenters are used for face direction detection in the horizontal direction, as an example.

The direction detector section 15 obtains the barycenter fq of the sum area fe of the hair area he and the skin area se, and the barycenter of the skin area se, in the step S54. Then, as processing in a step S55, the direction detector section 15 obtains a difference value by subtracting a value of the barycenter of the sum area fe of the hair area he and the skin area se from a value of the barycenter of the skin area se.

Figure 18:
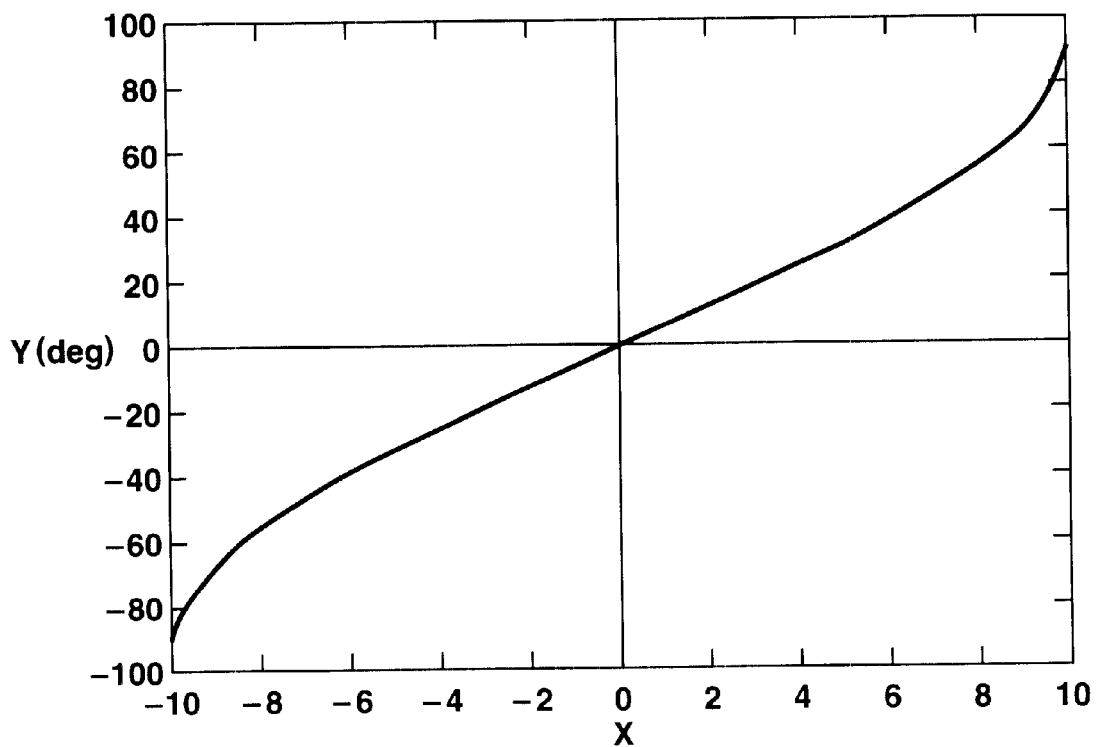
FIG. 18 is a graph showing an example of a relation between a difference value and an angle in face direction detection.

Next, as processing in a step S56, the direction detector section 15 detects a face direction, from the difference value obtained in the step S55. That is, for example, either one of the following two methods is utilized for processing of detecting a face direction from the difference value. Here, the difference value and the face direction angle are respectively expressed as X and Y, and the angle when the conference attendant 3A faces to a direction of the camera 13 is defined as 0 degree. In an example of one of the methods for processing in the step S56, prior to detection processing of the face direction, statistics concerning the difference value X and the angle of the face direction Y are previously obtained, and the value of the face direction angle Y corresponding to the difference value X is obtained as an average value, for example. A graph of correspondence therebetween is prepared as shown in FIG. 18, and the face direction angle Y is obtained from the difference value obtained in the step S55. In an example of the other one of the methods for processing in the step S56, the face direction angle Y is obtained by the following expression (13), using the difference value Y obtained in the step S55.

$$Y = a \sin(X) \tag{13}$$

By the flow as described above, the face direction of the conference attendant 3A is detected in the direction detector section 15.

As another specific method for detecting the direction in which the conference attendant 3A faces, it is possible to carry out direction detection by using an image obtained in a manner in which infrared rays are irradiated onto to the face of the conference attendant 3A and the infrared rays reflected on the face of the conference attendant 3A may be received thereby to generate an image.

Next, attention levels detected by the attention level detector section 131, 132 and 133 of the remote conference apparatus 1A according to the present embodiment, and a specific example of adjustment processing performed by the adjusting sections 161, 162 and 163 on the basis of the detected attention level, will be explained below.

Figure 19:
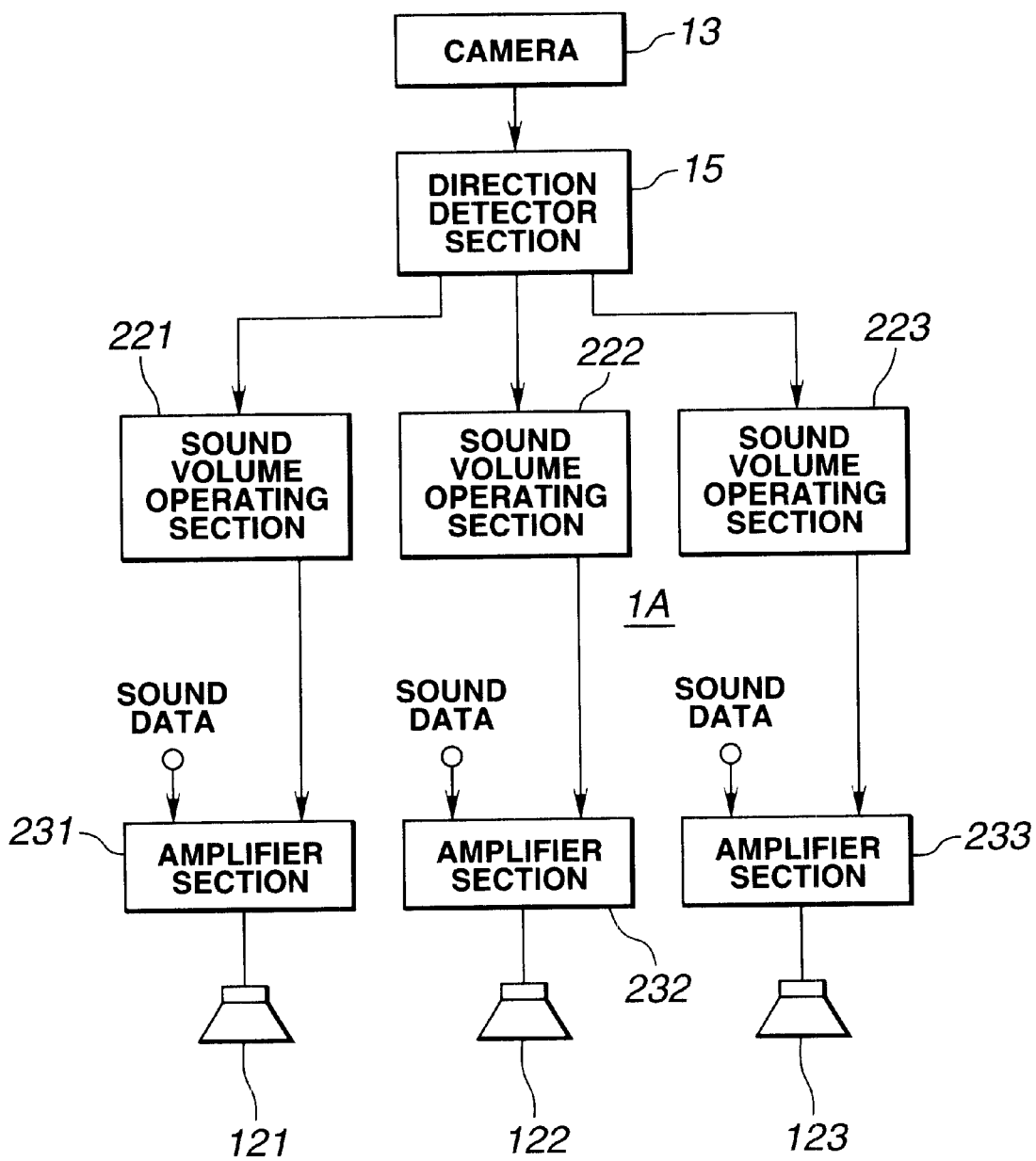
FIG. 19 is a block diagram showing a structural example of a main part in case of controlling sound volume in a remote conference apparatus.
Figure 20:
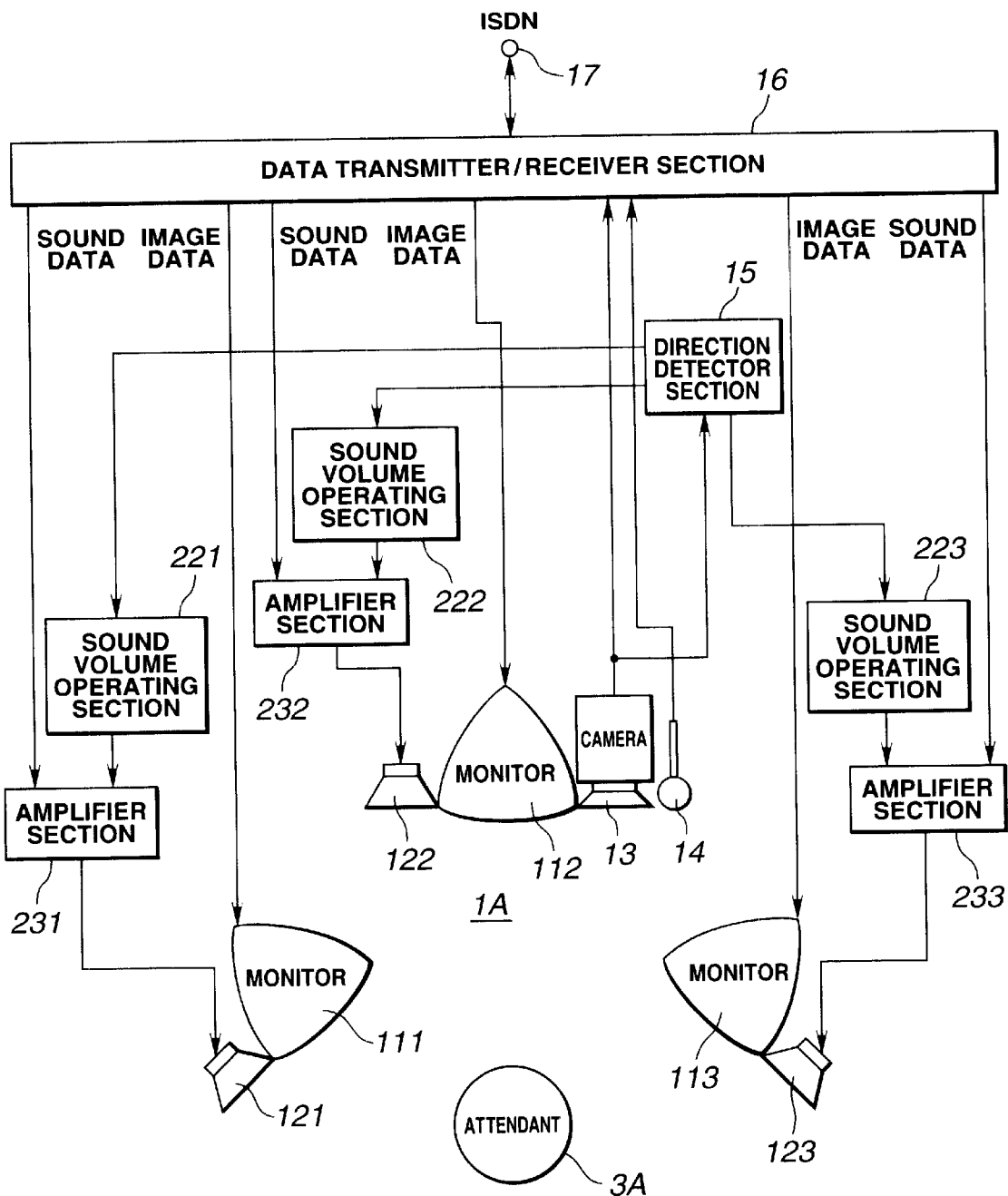
FIG. 20 is a block diagram showing a specific structural example of a main part in case of controlling sound volume in a remote conference apparatus.

A first example of the attention level detection and adjustment processing will be processing for amplifying sound data transmitted from the remote conference apparatus 1B, 1C and 1D to the remote conference apparatus 1A, in correspondence with a detection result of the direction detector section 15. FIG. 19 shows a schematic structure of a main part of the remote conference apparatus 1A in case where sound data is amplified in correspondence with a detection result of the direction detector section 15, as the first specific example of the attention level detection and the adjustment processing. A specific structure and layout of structure components of the remote conference apparatus 1A in FIG. 19 are arranged as shown in FIG. 20. In these FIGS. 19 and 20, those structural components that correspond to the components in FIGS. 3 and 4 will be designated with the same reference symbols as those of FIGS. 3 and 4, and explanations thereof are omitted.

In these FIGS. 19 and 20, the direction detector section 15 of the remote conference apparatus 1A detects a direction in which the conference attendant 3A faces, i.e., the eye direction or face direction as described above, based on image data from the camera 13, and supplies the detection result to a sound volume operating section 221 corresponding to the attention level detector section 131, a sound volume operating section 222 corresponding to the attention level detector section 132, and a sound volume operating section 223 corresponding to the attention level detector section 133.

Based on a signal supplied from the direction detector section 15, the sound volume operating section 221 operates and obtains an amplification rate G (t) used when a sound amplification or reduction is carried out by an amplifier section 231 in a rear stage, as a parameter P(t) in the attention level detector section 131. That is, the sound volume operating section 221 obtains the amplification rate G (t) as a parameter P (t) of the expression (1). In this case, the minimum parameter Pmin of the expression (1) is a minimum amplification rate Gmin.

Also, in the sound volume operating section 222, an amplification rate G(t) used when a sound amplification or reduction is carried out by an amplifier section in a rear stage is obtained as a parameter P (t) in the attention level detector section 131, by operation based on a signal supplied from the direction detector section 131.

Likewise, in the sound volume operating section 223, based on a signal supplied from the direction detector section 131, an amplification rate G (t) used when sound amplification or reduction is carried out by an amplifier section in a rear stage is obtained as a parameter P (t) in the attention level detector section 131, by operation.

The amplification rate G (t) outputted from the sound volume operating section 221 is supplied to the amplifier section 231, the amplification rate G (t) outputted from the sound volume operating section 222 is outputted to the amplifier section 232, and the amplification rate G (t) outputted from the sound volume operating section 223 is supplied to the amplifier section 233. The amplifier section 231 is supplied with sound data from the remote conference apparatus 1B through the data transmitter/receiver 16, the amplifier section 232 is supplied with sound data from the remote conference apparatus 1C through the data transmitter/receiver 16, and the amplifier section 233 is supplied with sound data from the remote conference apparatus 1D through the data transmitter/receiver 16.

When the amplifier section 231 receives the amplification rate G(t) supplied from the sound volume operating section 221, the amplifier section 231 amplifies or reduces the sound of the conference attendant 3B supplied from the remote conference apparatus 1B, based on the amplification rate G (t). When the amplifier section 232 receives the amplification rate G (t) supplied from the sound volume operating section 222, the amplifier section 232 amplifies or reduces the sound of the conference attendant 3C supplied from the remote conference apparatus 1C, based on the amplification rate G (t). When the amplifier section 233 receives the amplification rate G (t) supplied from the sound volume operating section 223, the amplifier section 233 amplifies or reduces the sound of the conference attendant 3D supplied from the remote conference apparatus 1D, based on the amplification rate G(t).

A sound signal outputted from the amplifier section 231 is supplied to the loudspeaker 121 and is outputted as sound. A sound signal outputted from the amplifier section 232 is supplied to the loudspeaker 122 and is outputted as sound. A sound signal outputted from the amplifier section 233 is transmitted to the loudspeakers 123 and is outputted as sound.

Figure 21:
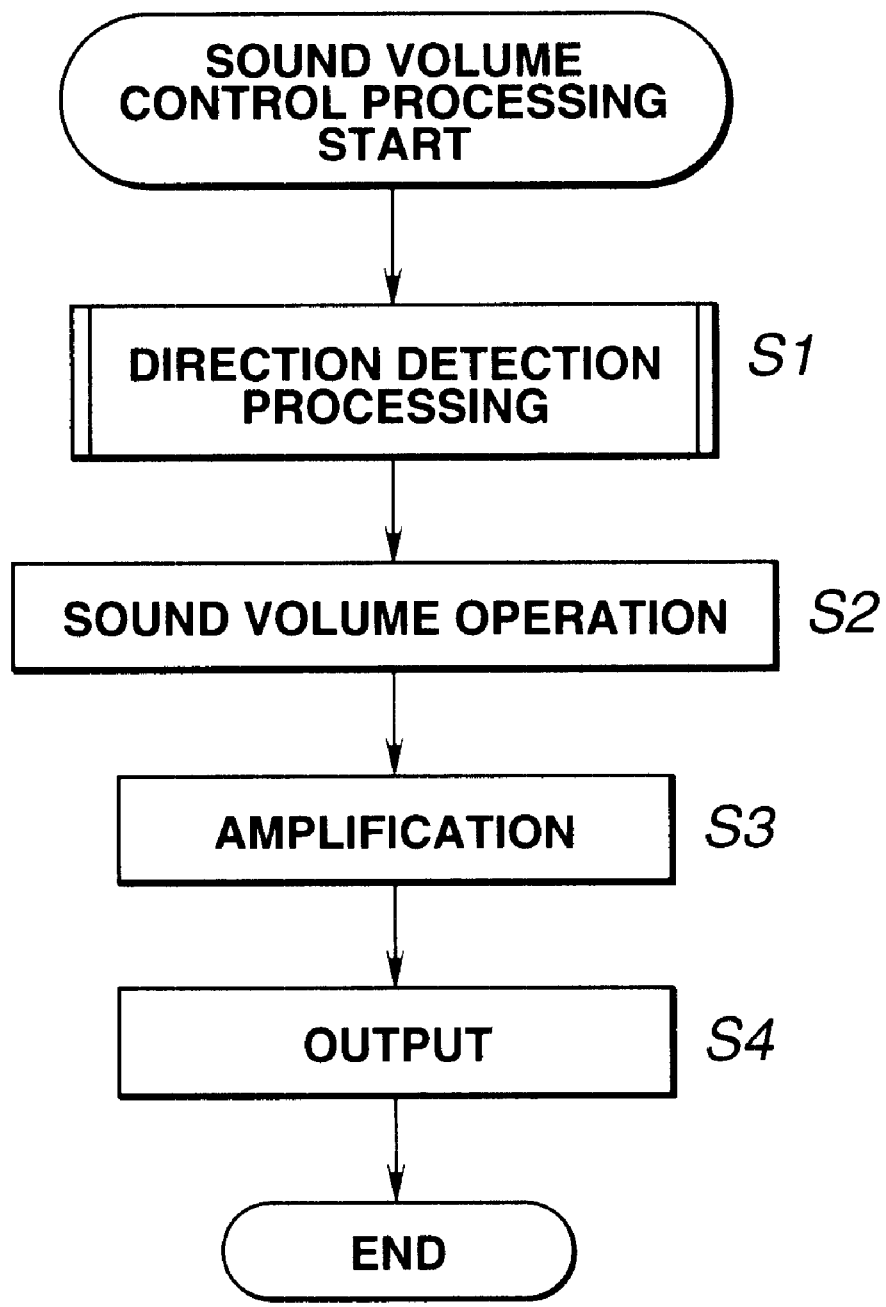
FIG. 21 is a flowchart showing a flow of sound volume control processing.

FIG. 21 shows a flow of processing in the remote conference apparatus 1A in case where sound data is amplified in correspondence with the detection result of the direction detector section 15, as a first example of a process of attention level detection and adjustment.

In FIG. 21, the direction detector section 15 of the remote conference apparatus 1A analyzes image data from the camera 13 and detects the direction in which the conference attendant 3A faces, as processing in a step S1.

Next, as processing in a step S2, based on the detection result of the direction detector section 15, sound volume operating sections 221, 222, and 223 respectively operate amplification rates Gain(t) with respect to sound data of the conference attendant 3B, 3C, and 3D transmitted from the corresponding remote conference apparatus 1B, 1C, and 1D, using also the expression (1), and respectively supply the rates to the corresponding amplifier sections 231 to 233.

Next, as processing in a step S3, amplifier sections 221, 222 and 223 of the remote conference apparatus 11A respectively amplify or reduce sound data of the conference attendants 3B, 3C, and 3D supplied from the corresponding remote conference apparatuses 1B, 1C, and 1D, based on the amplification rates Gain (t) supplied from the corresponding sound volume operating sections 221, 222, and 223, and respectively output the data to the corresponding loudspeakers 121, 122, and 123.

In this manner, as processing in a step S4, sounds based on the sound data inputted from the corresponding amplifier sections 231, 232, and 233 are respectively outputted from the corresponding loudspeakers 121, 122, and 123 of the remote conference apparatus 1A.

Next, a second specific example of detection of attention levels detected by the attention level detector sections 131, 132, and 133 of the remote conference apparatus 1A according to the present embodiment and adjustment processing carried out by the adjusting sections 161, 162, and 163 on the basis of the detected attention levels will be sound quality processing that performs, for example, frequency characteristic control on sound data transmitted from the remote conference apparatuses 1B, 1C, and 1D to the remote conference apparatus IA, in correspondence with the detection result of the direction detector section 15.

Figure 22:
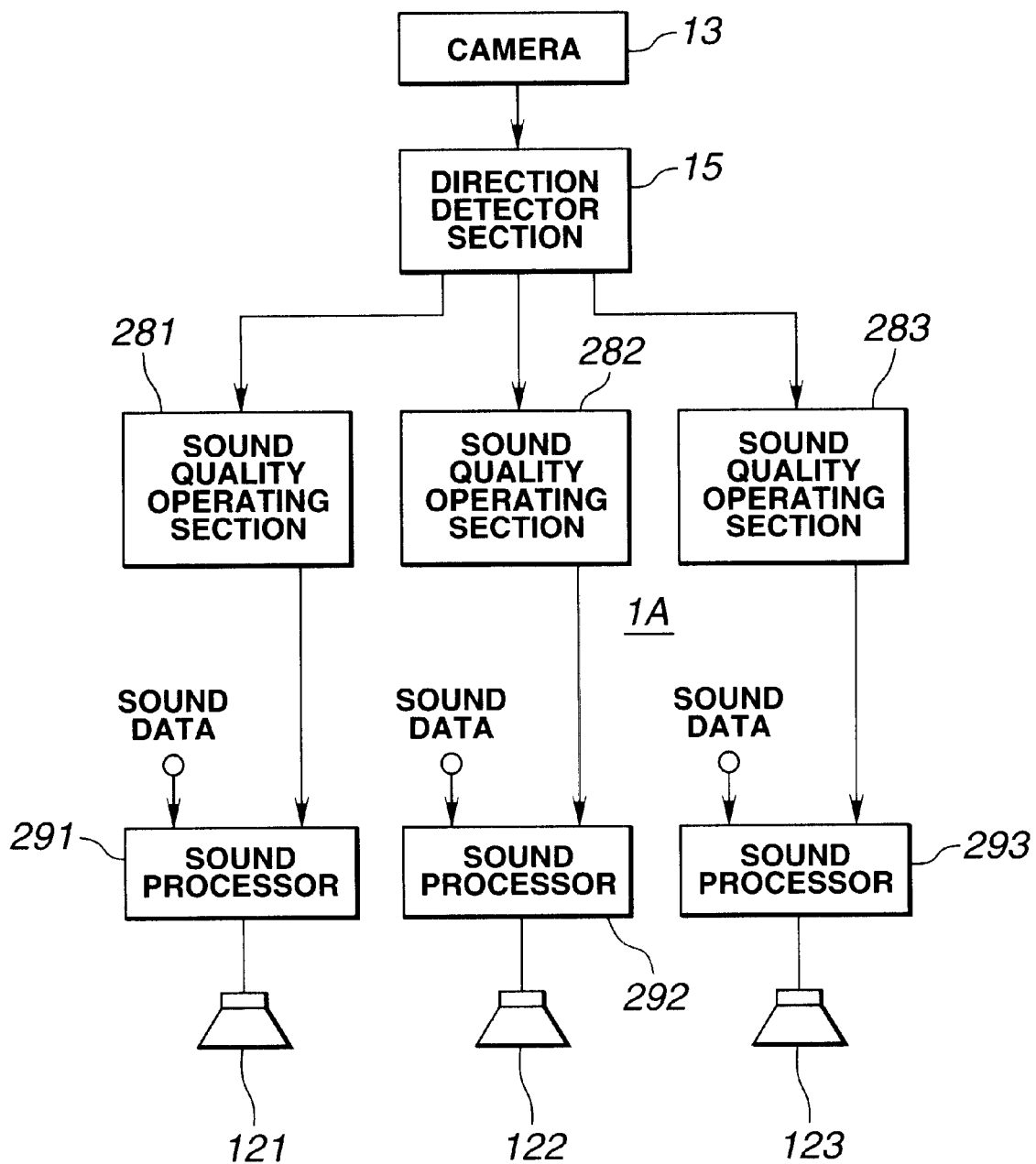
FIG. 22 is a block diagram showing a structural example of a main part in case of controlling sound quality in a remote conference apparatus.
Figure 23:
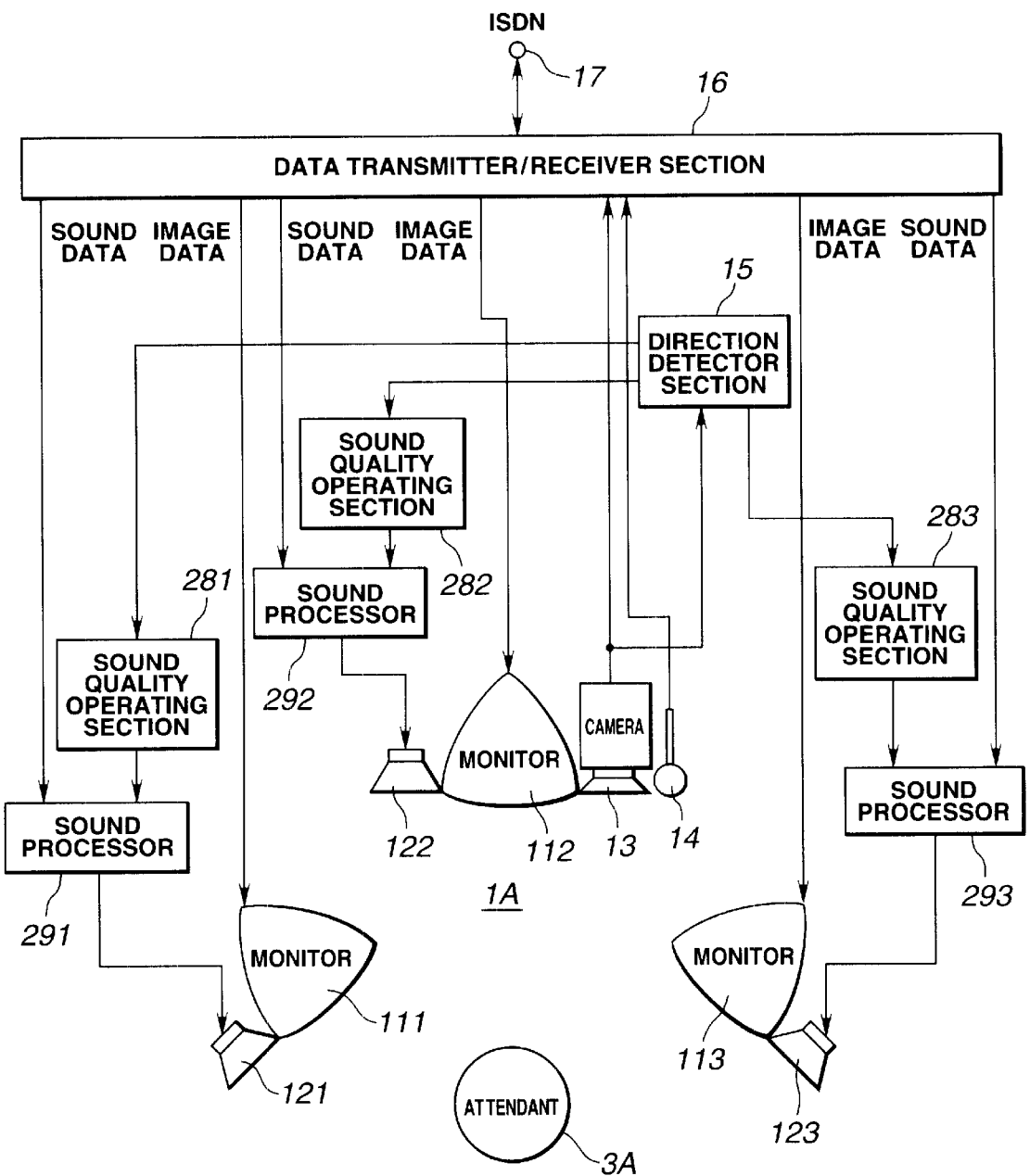
FIG. 23 is a block diagram showing a specific structural example of a main part in case of controlling sound quality in a remote conference apparatus.
Figure 24:
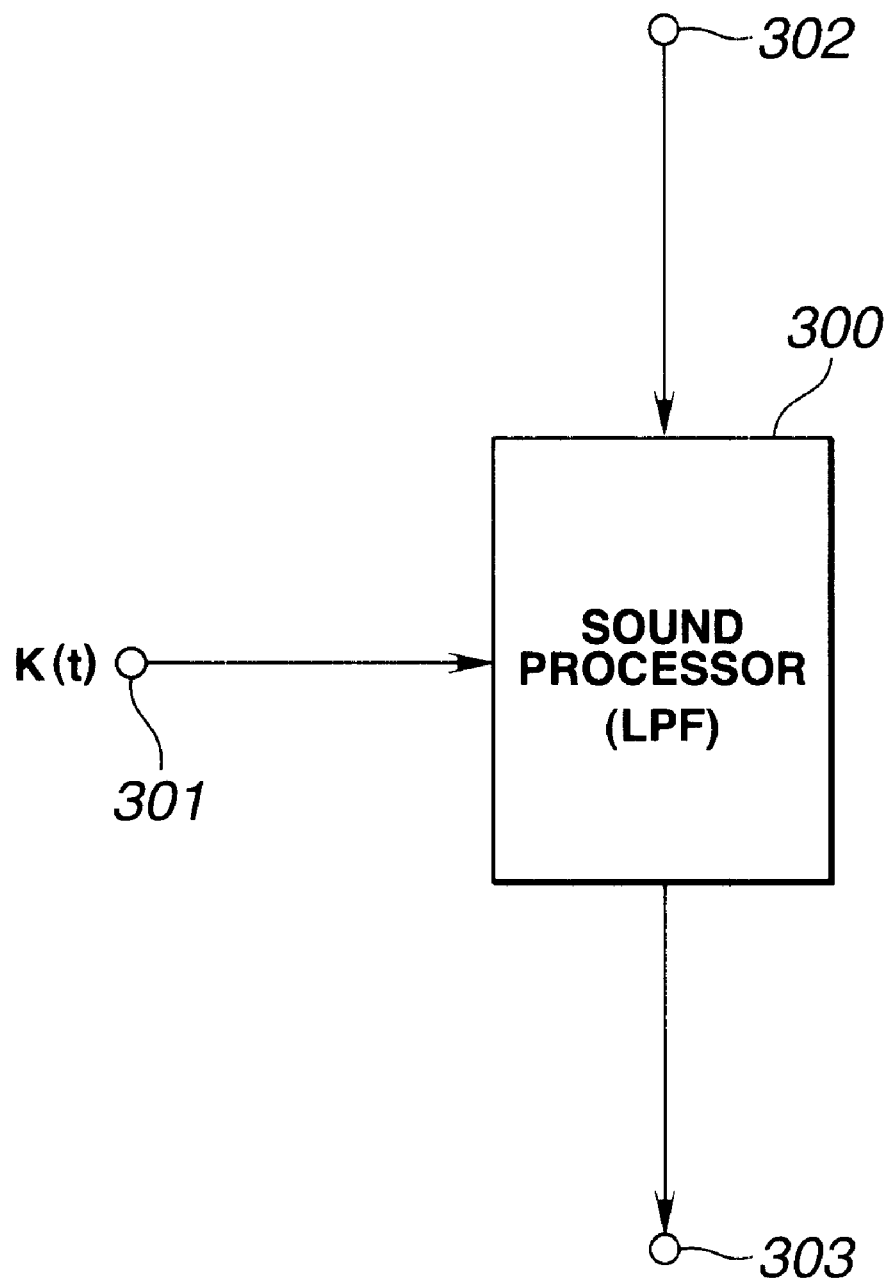
FIG. 24 is a block diagram showing a specific structural example of a sound processor in case of controlling sound quality.

As a second specific example of attention level detection and adjustment processing, FIG. 22 shows a schematic structure of a main part of the remote conference apparatus 1A in case where sound quality processing is performed in correspondence with the detection result of the direction detector section 15. A specific structure and layout of structural components of the remote conference apparatus 1A shown in the example of FIG. 23 are arranged as shown in FIG. 24. In these FIGS. 22 and 23, structural components corresponding to those in FIGS. 3 and 4 are designated at the same reference symbols in FIGS. 3 and 4, and detailed explanation thereof will be omitted herefrom.

In FIGS. 22 and 23, the direction detector section 15 of the remote conference apparatus 1A detects the direction in which the conference attendant faces, i.e., the eye direction or face direction as described above on the basis of the image data from the camera 13, and supplies the detection result to a sound quality operating section 281 corresponding to the attention level detector section 131, a sound quality operating section 282 corresponding to the attention level detector section 132 and a sound quality operating section 283 corresponding to the attention level detector section 133.

In the sound quality operating section 281, based on a signal supplied from the direction detector section 15, a filter parameter K (t) used when carrying out frequency characteristic control in a sound processor 291 in a rear stage, i.e., filter processing (e.g., low-pass filter processing) is obtained, as a filter parameter P (t) in the attention level detector section 131, by operation. That is, the sound quality operating section 281 obtains the filter parameter K (t) as the parameter P (t). In this case, the minimum parameter Pmin is the minimum filter parameter Kmin.

Also, in the sound quality operating section 282, based on the signal supplied from the direction detector section 15, a parameter P (t) when carrying out filter processing in the sound processor in a rear stage thereof is obtained as a parameter P(t) of the attention level detector section 132, by operation.

Likewise, in the sound quality operating section 283, based on the signal supplied from the direction detector section 15, a parameter P (t) used when carrying out the filter processing in the sound processor 293 in a rear stage is obtained as a parameter P (t) in the attention level detector section 133, by operation.

The filter parameter K (t) outputted from the sound quality operating section 281 is transmitted to the sound processor 292, the filter parameter K (t) outputted from the sound quality operating section 282 is transmitted to the sound processor 292, and the filter parameter K (t) outputted from the sound quality operating section 283 is transmitted to the sound processor 293. The sound processor 291 is supplied with sound data from the remote conference apparatus 1B through the data transmitter/receiver 16, the sound processor 292 is supplied with sound data from the remote conference apparatus 1C through the data transmitter/receiver 16, and the sound processor 293 is supplied with sound data from the remote conference apparatus 1D through the data transmitter/receiver 16.

Upon receipt of the filter parameter K (t) supplied from the sound quality operating section 281, the sound processor 291 performs filter processing such as low-pass filter processing (LPF processing) on sound data of the conference attendant 3B supplied from the remote conference apparatus 1B, based on the parameter K (t). Upon receipt of the filter parameter K (t) supplied from the sound quality operating section 282, the sound processor 292 performs filter processing such as low-pass filter processing (LPF processing) on sound data of the conference attendant 3C supplied from the remote conference apparatus 1C, based on the parameter K (t). Upon receipt of the filter parameter K (t) supplied from the sound quality operating section 283, the sound processor 293 performs filter processing such as low-pass filter processing (LPF processing) on sound data of the conference attendant 3D supplied from the remote conference apparatus 1D, based on the parameter K (t).

A sound signal outputted from the sound processor 291 is transmitted to the loudspeaker 121 and is outputted as sound. A sound signal outputted from the sound processor 292 is transmitted to the loudspeaker 122 and is outputted as sound. A sound signal outputted from the sound processor 293 is transmitted to the loudspeaker 123 and is outputted as sound.

FIG. 24 shows a specific structural example of the sound processors 291, 292 and 293. The sound processors 291, 292, and 293 have one same structure, and therefore, only the structure of the sound processor 291 is shown in FIG. 24, for example.

Figure 25:
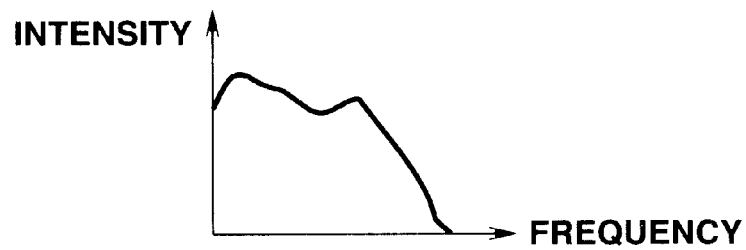
FIG. 25 is a graph showing a frequency characteristic of an input sound signal to a sound processor.
Figure 26:
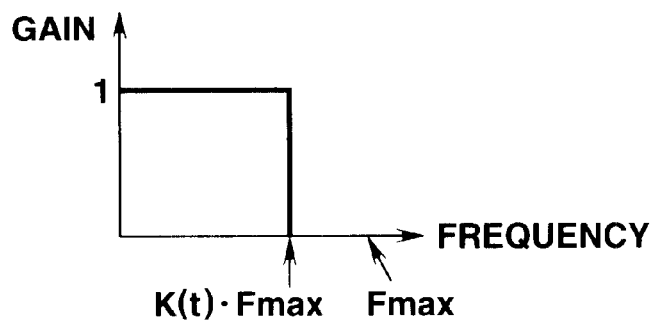
FIG. 26 is a graph showing a frequency control characteristic of a sound processor.

In FIG. 24, sound data having a frequency characteristic as shown in FIG. 25, which is supplied from the remote conference apparatus 1B through the data transmitter/receiver, is inputted to a terminal 302, and a filter parameter K(t) having a frequency control characteristic as shown in FIG. 26, which is supplied from the sound quality operating section 281, is inputted to a terminal 301. Fmax shown in FIG. 26 is a maximum frequency (fixed value) of input sound. The sound data supplied through the terminal 302 and the filter parameter K (t) supplied through the terminal 301 are inputted to a LPF (low-pass filter) 300 which is a main structural component of the sound processor 291.

Figure 27:
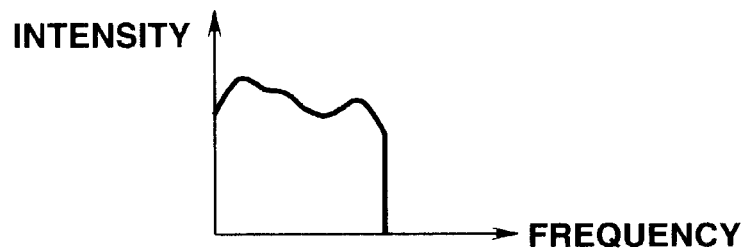
FIG. 27 is a graph showing a frequency characteristic of an output sound signal from a sound processor.

The LPF 300 performs low-pass filer processing having a cutoff frequency of K (t) Fmax, as shown in FIG. 26, on the sound data inputted from the terminal 302 and having a characteristic as shown in FIG. 25. By this processing, output sound data having a characteristic shown in FIG. 27 is obtained from the LPF 300. The output sound data is transmitted from the terminal 303 to the loudspeaker 121 structured in a rear stage. Sound outputted from the loudspeaker 121 becomes sound subjected to frequency characteristic control which enables easy listening when attention is paid.

Figure 28:
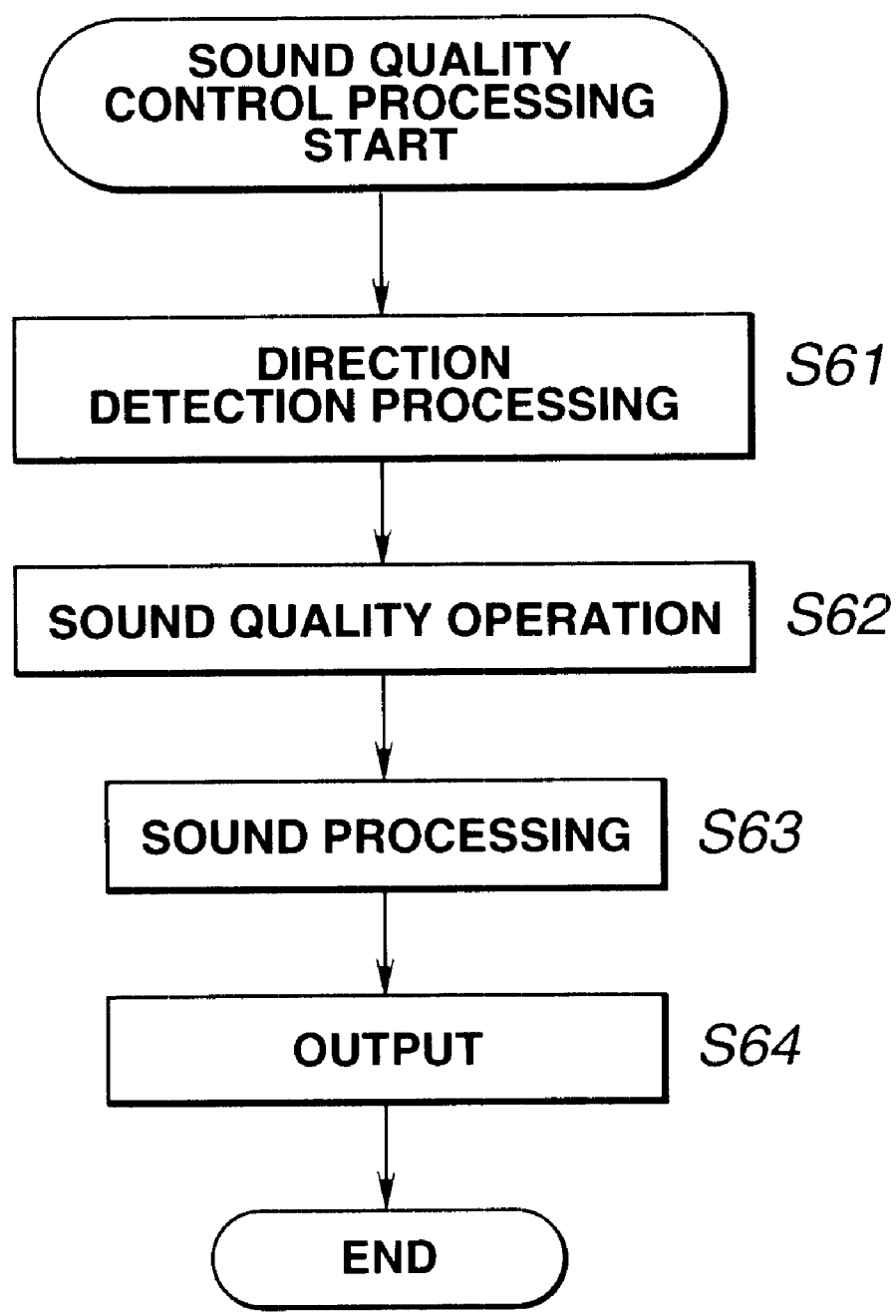
FIG. 28 is a flowchart showing a flow of sound quality control processing.

FIG. 28 shows, as a second specific example of the attention level detection and the adjustment processing, a flow of processing in the remote conference apparatus 1A in case where filter processing is performed in correspondence with the detection result of the direction detector section 15.

In FIG. 28, the direction detector section 15 of the remote conference apparatus 1A analyzes image data from the camera 13 and detects the direction in which the conference attendant 3A faces, as processing in a step S61.

Next, as processing in a step S62, the sound quality operating sections 281, 282, and 283 respectively operate filter parameters K (t) with respect to sound data of the conference attendants 3B, 3C, and 3D transmitted from the remote conference apparatuses 1B, 1C, and 1D, based on the detection result of the direction detector section 15, by using the expression (1) described previously, and respectively supply the data to corresponding sound processors 291 to 293.

Next, as processing in a step S63, sound processors 291, 292, and 293 of the remote conference apparatus 1A respectively perform filter processing on sound data of the conference attendants 3B, 3C, and 3D supplied from the corresponding remote conference apparatuses 1B, 1C, and 1D, based on the parameters P (t) supplied from the corresponding sound quality operating sections 281, 282, and 283, and respectively output sound data to the corresponding loudspeakers 121, 122, and 123.

In this manner, as processing of a step S64, sounds based on the sound data inputted from the corresponding sound processors 291, 292 and 293 respectively are outputted from the loudspeakers 121, 122, and 123 of the remote conference apparatus 1A.

As described above, according to the remote conference apparatus 1A as a second specific example of the attention level detection and the adjustment process in case where sound data is subjected to filter processing in correspondence with the detection result of the direction detector section 15, when a time equal to or longer than a constant time Tcon passes in a state in which the conference attendant 3A keeps facing toward any of the monitor sections 111, 112, and 113, the conference attendant 3A is determined as paying attention to another conference attendant displayed on the monitor section provided in the direction, and the sound quality of the conference attendant to whom attention is paid is raised while the sound quality of the other conference attendants who are displayed on the other monitor sections to which attention is not paid is lowered. As a result, it is possible to listen easily the speech of the conference attendant who is displayed on the monitor section in the direction in which the conference attendant 3A pays attention.

Also, according to the remote conference apparatus 1A in the case of the second specific example, even when the conference attendant 3A stops paying attention to the conference attendant displayed on a monitor section in a certain direction, the sound quality is kept high until the time Tcont passes, and the sound quality is decreased gradually thereafter. In this manner, for example, even if the conference attendant 3A turns gradually to another conference attendant than the conference attendant to whom the conference attendant 3A has been paying attention, it is not necessary to lower the sound quality of the conference attendant to whom the conference attendant 3A has originally been paying attention.

Further, according to the remote conference apparatus 1A in the case of the second specific example, when a constant time Tcont or a longer time passes in a state where the conference attendant 3A keeps facing to any monitor section, the conference attendant 3A is determined as paying attention to the monitor section in this direction. Therefore, for example, the sound quality control is prevented from responding too sensitively, for example, when the direction of the conference attendant 3A temporarily shifts or when the conference attendant 3A temporarily faces to each of monitor sections.

Next, as a third specific example of the processing of detection of attention levels in the attention level detecting sections 131, 132, and 133 and adjustment processing carried out by the adjusting sections 161, 162, and 163 based on the detected attention levels, it is possible to cite processing in which image data supplied to the remote conference apparatus 1A from the other remote conference apparatuses 1B, 1C, and 1D is subjected to image quality processing in accordance with the detection result of the direction detector section 15.

Figure 29:
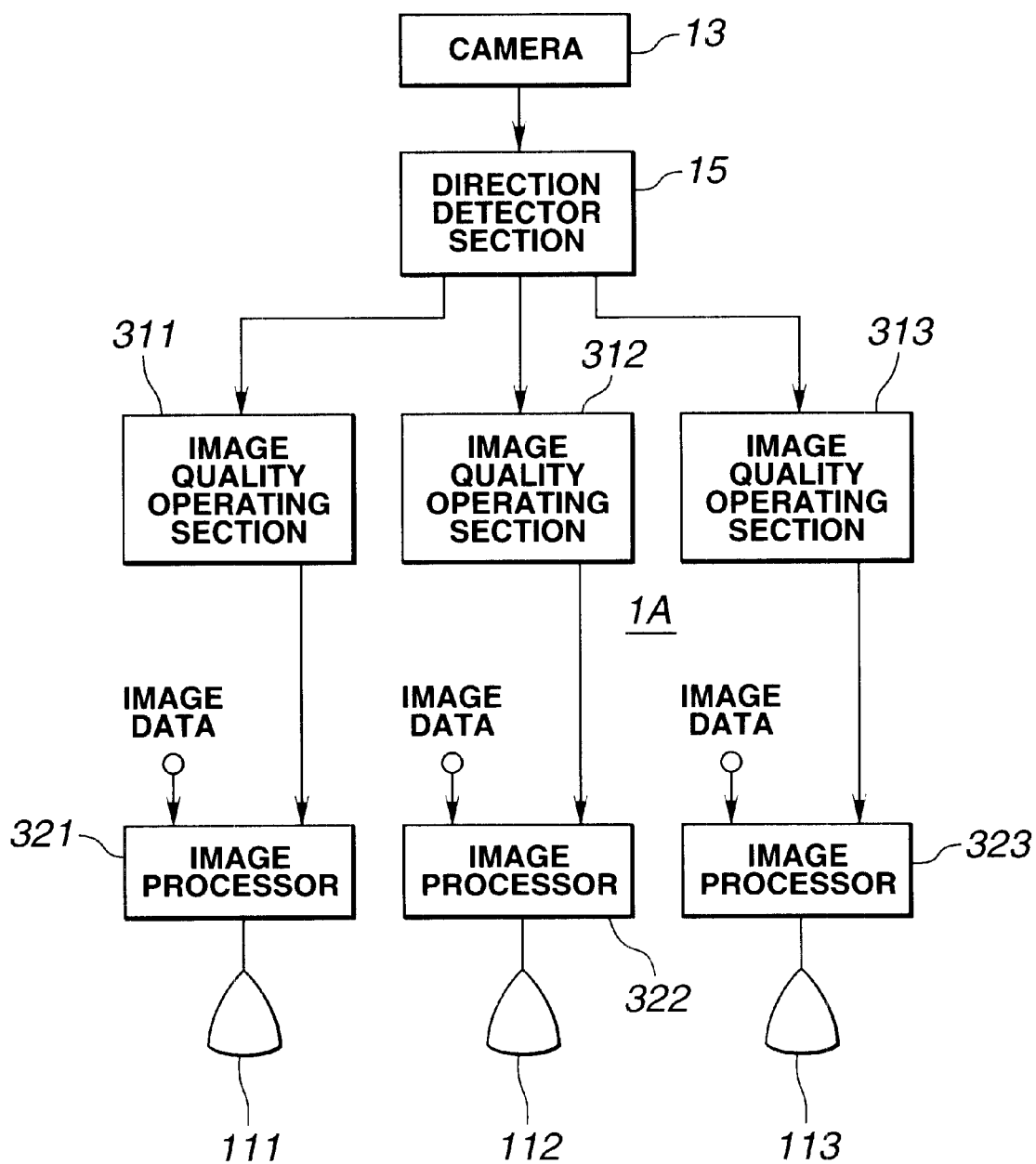
FIG. 29 is a block diagram showing a structural example of a main part in case of performing image control in a remote conference apparatus.
Figure 30:
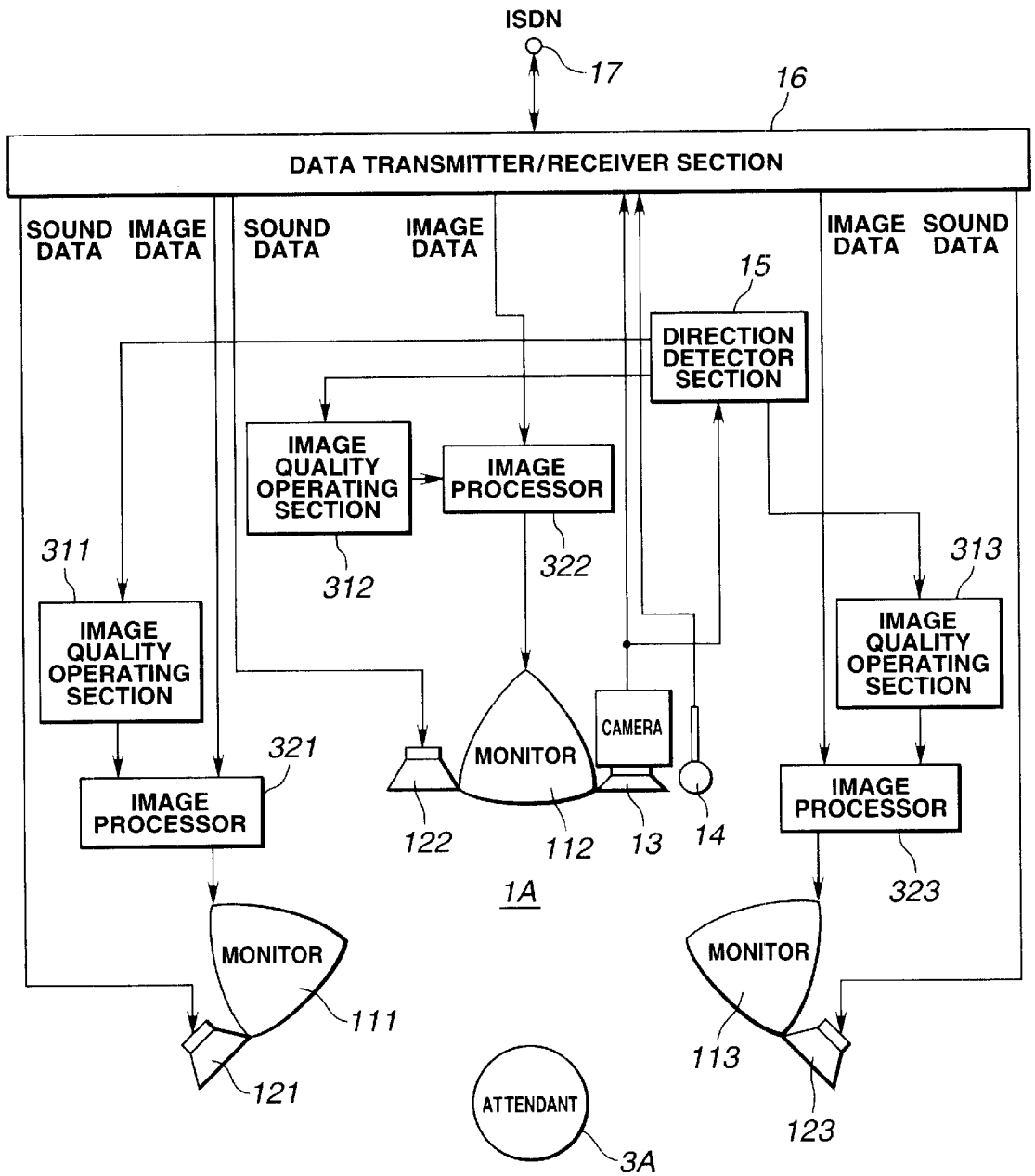
FIG. 30 is a block diagram showing a specific structural example of a main part in case of performing image control in a remote conference apparatus.

FIG. 29 shows, as the third specific example of the attention level detection and the adjustment processing, a schematic structure of a main part of the remote conference apparatus 1A in case where image quality processing is performed in accordance with the detection result of the direction detector section 15. A specific structure and layout of the structural components of the remote conference apparatus 1A in the example of FIG. 29 are arranged as shown in FIG. 30. In FIGS. 29 and 30, structural components corresponding to FIGS. 3 and 4 are denoted at the same reference symbols, and detailed explanation thereof will be omitted herefrom.

In FIGS. 29 and 30, the direction detector section 15 of the remote conference apparatus 1A detects the direction in which the conference attendant 3A faces based on image data from the camera 13, i.e., detects the eye direction or face direction as described above, and supplies a detection result to an image quality operating section 311 corresponding to the attention level detector section 131, an image quality operating section 312 corresponding to the attention level detector section 132, and an image quality operating section 313 corresponding to the attention level detector section 133.

In the image quality operating section 311, based on the signal supplied from the direction detector section 15, an image quality adjustment value V (t) used when image processing is performed in the image processor 321 in a rear stage is obtained as a parameter P (t) in the attention level detector section 131 by operation. That is, the image quality operating section 311 obtains the image quality adjustment value V (t) as the parameter P(t) in the expression (1). In this case, the minimum parameter Pmin in the expression (1) is the immune control value Vmin. The image processing will be color processing achieved by adjusting gains of primary color data of R (red), G (green), and B (blue), brightness adjustment processing, processing for adjusting the resolution and sharpness of an image, and the like.

In the image quality operating section 312, based on the signal supplied from the direction detector section 15, an image quality adjustment value V (t) used when image processing is performed in the image processor 322 in a rear stage is obtained as a parameter P (t) in the attention level detector section 132, by operation.

In the image quality operating section 313, based on the signal supplied from the direction detector section 15, an image quality adjustment value V (t) used when image processing is performed in the image processor 323 in a rear stage is obtained as a parameter P (t) at the attention level detector section 133, by operation.

The image quality adjustment value V (t) outputted from the image quality operating section 311 is transmitted to the image processor 321, the image quality adjustment value V (t) outputted from the image quality operating section 312 is transmitted to the image processor 322, and the image quality adjustment value V (t) outputted from the image quality operating section 313 is transmitted to the image processor 323. Image data from the remote conference apparatus 1B is supplied to the image processor 321 through the data transmitter/receiver 16, image data from the remote conference apparatus 1C is supplied to the image processor 322 through the data transmitter/receiver 16, and image data from the remote conference apparatus 1D is supplied to the image processor 323 though the data transmitter/receiver 16.

Upon receipt of the image quality adjustment value V (t) supplied from the image quality operating section 311, the image processor 321 performs image processing on image data of the conference attendant 3B supplied from the remote conference apparatus 1B, based on the image value V (t). Also, upon receipt of the image quality adjustment value V (t) supplied from the image quality operating section 312, the image processor 322 performs image processing on image data of the conference attendant 3C supplied from the remote conference apparatus 1C, based on the image quality adjustment value V (t). Likewise, upon receipt of the image quality adjustment value V (t) supplied from the image quality operating section 313, the image processor 323 performs image processing on image data of the conference attendant 3D supplied from the remote conference apparatus 1D, based on the image quality adjustment value V (t).

An image signal outputted from the image processor 321 is transmitted to the monitor section 113 and is displayed as an image.

Figure 31:
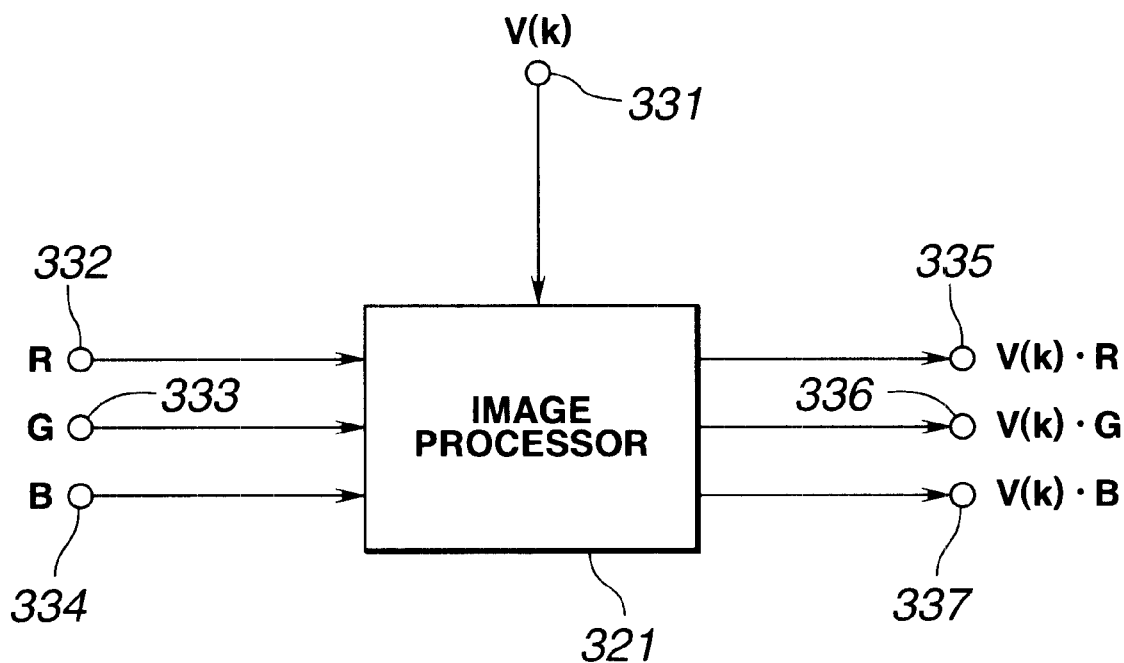
FIG. 31 is a block diagram showing a specific structural example of an image processor in case of performing image control.

FIG. 31 shows a specific example of structures of the image processors 321, 322, and 323. The image processors 321, 322, and 323 have one same structure, and therefore, only the structure of the image processor 321 is shown in FIG. 31, for example. In FIG. 31, processing for adjusting gains of primary colors R, G, and B is cited as an example of the image processing.

In FIG. 31, terminals 332, 333, and 334 are inputted with primary color data R, G, and B supplied from the remote conference apparatus 1B through the data transmitter/receiver 16, and a terminal 331 is inputted with the image quality adjustment value V (t) supplied from the image quality operating section 321. The primary color data R, G, and B through the terminals 332, 333, and 334, and the image quality adjustment value V (t) through the terminal 331 are inputted to the image processor 321.

The image processor 321 performs image processing using the image quality adjustment value V (t) inputted from the terminal 331, on the primary color data of R, G, and B inputted from the terminals 332, 333, and 334. By this processing, signals obtained by adjusting primary color signals of R, G, and B respectively by the image quality adjustment values V (t) are outputted from the image processor 321. The data of R, G, and B after the image processing are respectively outputted from terminals 335, 336, and 337 and transmitted to the monitor section 111 having the following structure.

Figure 32:
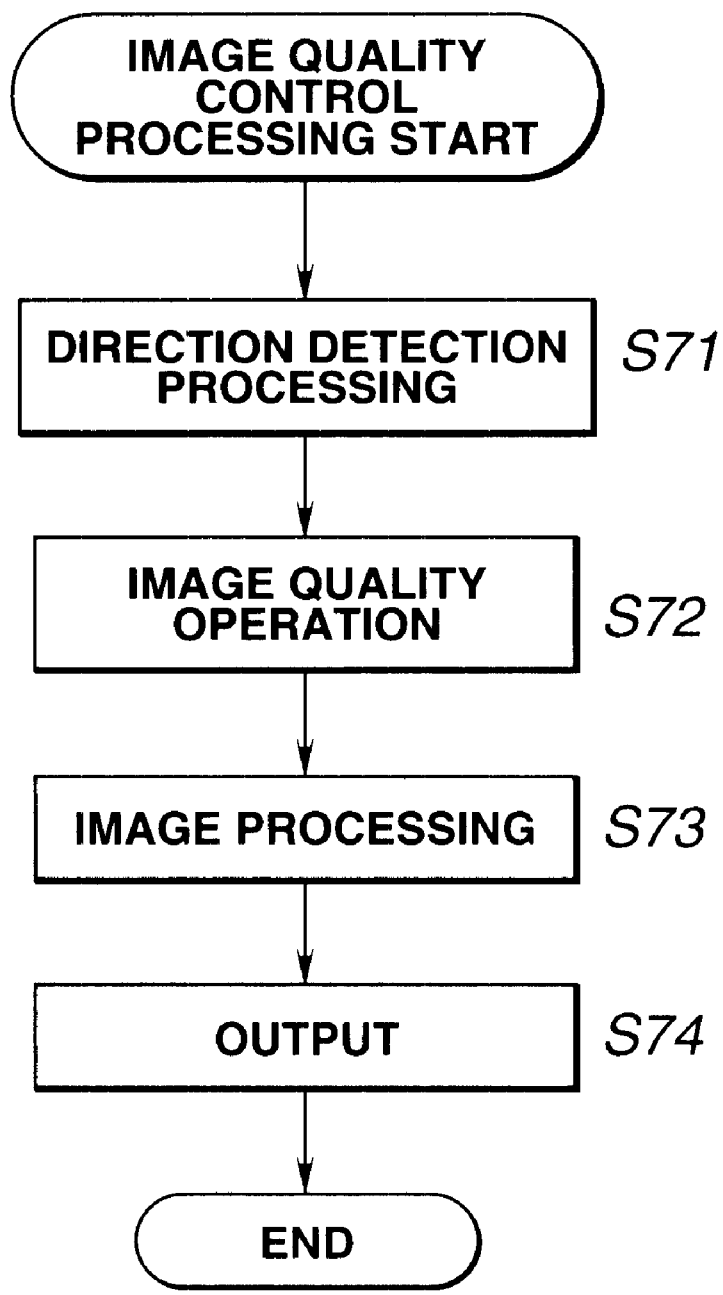
FIG. 32 is a flowchart showing a flow of image control processing.

FIG. 32 shows, as a third specific example of the attention level detection and the adjustment processing, a flow of processing in the remote conference apparatus 1A in case where image processing is performed on the image data in correspondence with the detection result of the direction detector section 15.

In FIG. 32, the direction detector section 15 of the remote conference apparatus 1A analyzes image data from the camera 13 and detects the direction in which the conference attendant 3A, as processing in a step S71.

Next, as processing in the step S72, the image quality operating sections 311, 312, and 313 respectively operate the image quality adjustment values V (t) corresponding to image data of the conference attendants 3B, 3C, and 3D transmitted from the remote conference apparatuses 1B, 1C, and 1D, based on the detection result of the direction detector section 15 by using the expression (1), and respectively supply the data to the image quality operating sections 321 to 323.

Next, as processing in a step S73, the image quality operating sections 321, 322, and 323 of the remote conference apparatus 1A respectively perform image quality adjustment processing on image data of the conference attendants 3B, 3C, and 3D supplied from the remote conference apparatuses 1B, 1C, and 1D, based on the image quality adjustment values V (t) supplied from the picture quality operating sections 311, 312, and 313, and respectively output the data to the monitor sections 111, 112, and 113.

In this manner, images based on the image data inputted from the image processors 321, 322, and 323 are respectively displayed on the monitor sections 111, 112, and 113 of the remote conference apparatus 1A, as processing in a step S74.

As described above, as the third specific example of the attention level detection and the adjustment processing, according to the remote conference apparatus 1A in case where image processing is performed on image data in correspondence with the detection result of the direction detector section 15, when a time equal to or longer than a constant time Tcont passes in a situation in which the conference attendant 3A keeps facing in a direction to any of the monitor section 111, 112, and 113, the remote conference apparatus 1A determines the attendant 3A as paying attention to the monitor in the direction, and raises image quality (color, brightness, resolution, sharpness, and the like of an image) of the conference attendant to whom the conference attendant 3A faces, while image quality of the conference attendant who is displayed on the monitor section to which attention is not paid is lowered. As a result, the image of the conference attendant displayed on the monitor section to which the conference attendant 3A faces can be watched easily.

Also, according to the remote conference apparatus 1A in the third specific example, even when the conference attendant 3A stops facing to the conference attendant displayed on the monitor section in a certain direction, image quality of the conference attendant is kept high until the time Tcont passes, and the image quality is thereafter lowered gradually. Therefore, for example, in case where the conference attendant 3A turns gradually to another conference attendant than the conference attendant to whom the conference attendant 3A has been paying attention, it is unnecessary to lower the image quality of the conference attendant to whom the conference attendant 3A has originally been paying attention.

Further, according to the remote conference apparatus 1A in the third specific example, when a time equal to or longer than the constant time Tcont passes in a situation the conference attendant 3A keeps facing in a direction to any monitor section, the conference attendant 3A is determined as paying attention to the monitor section in the direction. Therefore, for example, when the facing direction of the attendant 3A shifts temporarily or when the attendant 3A faces temporarily to each monitor section, the image quality control is prevented from responding too sensitively.

Figure 33:
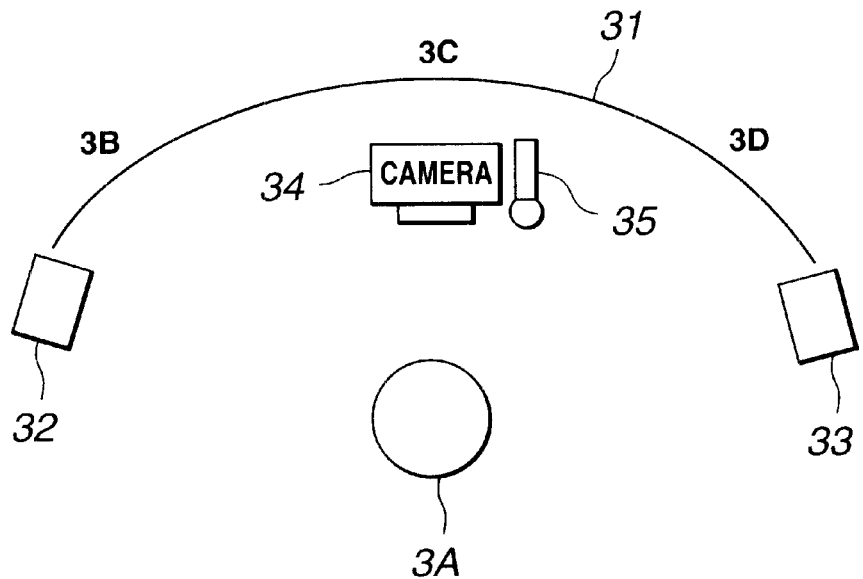
FIG. 33 is a block diagram showing a schematic structure in case where images of conference attendants are displayed on a screen and sound images are positioned by loudspeakers, as another example of a remote conference apparatus of the present invention.

Next, another example of the structure of the remote conference apparatus 1A is shown in FIG. 33.

In the example of the structure shown in FIG. 33, as a display device for displaying images of conference attendants 3B, 3C, and 3D of the other remote conference apparatuses 1B, 1C, and 1D, one curved screen 31 is provided in place of the monitor sections 111, 112, and 113 corresponding to the remote conference apparatuses 1B, 1C, and 1D shown in FIG. 2.

That is, in this structural example, images of the other conference attendants 3B, 3C, and 3D are displayed as if the other conference attendants 3B, 3C, and 3D together with the conference attendant 3A sat around one table and had a conference.

A camera 34 and a microphone 35 are provided, for example, in front of the conference attendant 3A, and image data of the conference attendant 3A picked up by the camera 34 and sound data of the conference attendant 3A collected by the microphone 35 are transmitted to the remote conference apparatuses 1B to 1D through ISDN 2.

Meanwhile, sound data of the conference attendant 3B transmitted from the remote conference apparatus 1B is controlled such that the sound image thereof is centered near the image of the conference attendant 3B which is displayed on the screen 31. This sound data is supplied to the loudspeakers 32 and 33 arranged in both the right and left sides of the screen 31, and sound is outputted. Also, sound data of the conference attendant 3C transmitted from the remote conference apparatus 11C is controlled such that the sound image thereof is centered near the image of the conference attendant 3C which is displayed on the screen 31. This sound data is supplied to the loudspeakers 32 and 33 arranged in both the night and left sides of the screen 31, and sound is outputted. Likewise, sound data of the conference attendant 3D transmitted from the remote conference apparatus 1D is controlled such that the sound image thereof is centered near the image of the conference attendant 3D which is displayed on the screen 31. This sound data is supplied to the loudspeakers 32 and 33 arranged in both the right and left sides of the screen 31, and sound is outputted.

Also, in this structure shown in FIG. 33, sound data and image data of the conference attendants 3B to 3D are adjusted individually in correspondence with an attention level (parameter P(t)) obtained on the basis of the direction in which the conference attendant 3A faces, detected with use of the image data of the conference attendant 3A picked up by the camera 34, as described above.

Figure 34:
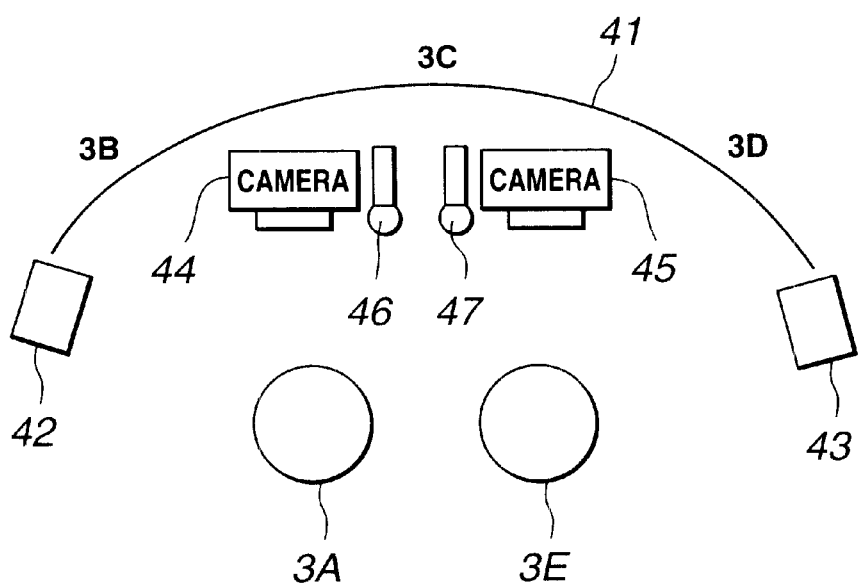
FIG. 34 is a block diagram showing a schematic structure in case where images of conference attendants are displayed on a screen and two conference attendants can sit together, as another example of a remote conference apparatus of the present invention.

Next, FIG. 34 shows an example of the other structure of the remote conference apparatus 1A.

That is, FIG. 34 shows an example of a structure of the remote conference apparatus 1A in which a curved screen 41 is provided like the example of the structure shown in FIG. 33 and further two conference attendants 3A and 3E can sit together.

In this structural example shown in FIG. 34, images of the other conference attendants 3B, 3C, and 3D are displayed on the screen 41 as if the other conference attendants 3B, 3C and 3D together with the conference attendants 3A and 3E had a conference around one table.

A camera 44 and a microphone 46 are provided, for example, in front of the conference attendant 3A, and an image of the conference attendant 3A picked up by the camera 44 and sound data of the conference attendant 3A collected by the microphone 44 are transmitted to the remote conference apparatuses 1B to 1D through ISDN 2.

Also, a camera 45 and a microphone 47 are provided, for example, in front of the conference attendant 3E, and an image of the conference attendant 3E picked up by the camera 45 and sound data of the conference attendant 3E collected by the microphone 45 are transmitted to the remote conference apparatuses 1B to 1D through the ISDN 2.

Sound data of the conference attendant 3B transmitted from the remote conference apparatus 1B is controlled such that the sound image is centered near the image of the conference attendant 3B which is displayed on the screen 41. This sound data is supplied to the loudspeakers 42 and 43 arranged in both the right and left sides of the screen 41, and sound is outputted. Also, sound data of the conference attendant 3C transmitted from the remote conference apparatus 1C is controlled such that the sound image is centered near the image of the conference attendant 3C which is displayed on the screen 41. This sound data is supplied to the loudspeakers 42 and 43 arranged in both the right and left sides of the screen 41, and sound is outputted. Likewise, sound data of the conference attendant 3D transmitted from the remote conference apparatus 1D is controlled such that the sound image is centered near the image of the conference attendant 3D which is displayed on the screen 41. This sound data is supplied to the loudspeakers 42 and 43 arranged in both the right and left side of the screen 31, and sound is outputted.

In this structural example shown in FIG. 34, sound data and image data of the conference attendants 3B to 3D are adjusted individually as described above in correspondence with an average value between an attention level (parameter P (t)) obtained on the basis of the direction in which the conference attendant 3A faces, detected with use of the image data of the conference attendant 3A picked up by the camera 44, and an attention level (parameter P (t)) obtained on the basis of the direction in which the conference attendant 3E faces, detected with use of the image data of the conference attendant 3E picked up by the camera 45. With respect to the image data, however, it is also possible to adjust the image data individually as described above in correspondence with the parameters P (t), without obtaining an average value between the parameter P (t) based on the direction of the conference attendant 3A and the parameter P(t) based on the direction of the conference attendant 3E.

Figure 35:
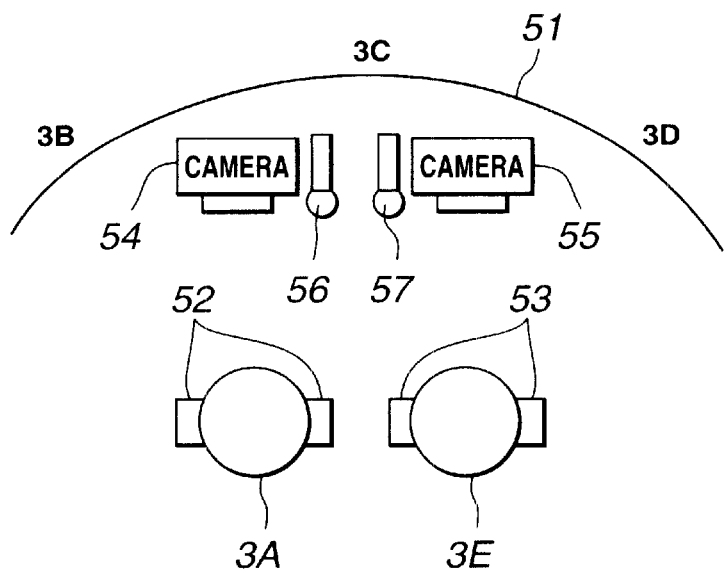
FIG. 35 is a block diagram showing a schematic structure in case where images of conference attendants are displayed on a screen and sound images are positioned by headphones, as another example of a remote conference apparatus of the present invention.

Next, FIG. 35 shows another example of the structure of the remote conference apparatus 1A.

That is, the structural example in FIG. 35 shows a case where one screen 51 curved like in the example of the structure in FIG. 34 so that further two conference attendants 3A and 3E can sit together but headphones 52 and 53 are provided for the conference attendants 3A and 3E in place of the loudspeakers 42 and 43 of the structural example in FIG. 34.

In this structural example shown in FIG. 35, images of the other conference attendants 3B, 3C and 3D are displayed on the screen 51 as if the other conference attendants 3B, 3C and 3D together with the conference attendant 3A and 3E sat around one table and had a conference together.

A camera 54 and a microphone 56 are provided, for example, in front of the conference attendant 3A, and image data of the conference attendant 3A picked up by the camera 54 and sound data of the conference attendant 3A collected by the microphone 56 are transmitted to the remote conference apparatuses 1B to 1D through ISDN 2.

Also, a camera 55 and a microphone 57 are provided, for example, in front of the conference attendant 3E, and image data of the conference attendant 3E picked up by the camera 55 and sound data of the conference attendant 3E collected by the microphone 55 are transmitted to the remote conference apparatuses 1B to 1D through ISDN 2.

Meanwhile, sound data of the conference attendant 3B transmitted from the remote conference apparatus 1B is controlled such that the sound image is centered near the image of the conference attendant 3B which is displayed on the screen 51. This sound data is supplied to the headphones 52 and 53 which the conference attendants 3A and 3E put on, and sound is outputted. Also, sound data of the conference attendant 3C transmitted from the remote conference apparatus 1C is controlled such that the sound image is centered near the image of the conference attendant 3C which is displayed on the screen 51. This sound data is supplied to the headphones 52 and 53 which the conference attendants 3A and 3E put on, and sound is outputted. Likewise, sound data of the conference attendant 3D transmitted from the remote conference apparatus 1D is controlled such that the sound image is centered near the image of the conference attendant 3D which is displayed on the screen 51. This sound data is supplied to the headphones 52 and 53 which the conference attendants 3A and 3E put on, and sound is outputted.

In this structural example shown in FIG. 35, sound data and image data of the conference attendants 3B to 3D are adjusted individually as described above in correspondence with an attention level (parameter P (t)) obtained on the basis of the direction in which the conference attendant 3A faces, detected with use of the image data of the conference attendant 3A picked up by the camera 54, and an attention level (parameter P (t)) obtained on the basis of the direction in which the conference attendant 3E faces, detected with use of the image data of the conference attendant 3E picked up by the camera 55. With respect to the image data, it is also possible to adjust the image data individually as described above in correspondence with an average value between the parameter P(t) based on the direction of the conference attendant 3A and the parameter P(t) based on the direction of the conference attendant 3E.

Figure 36:
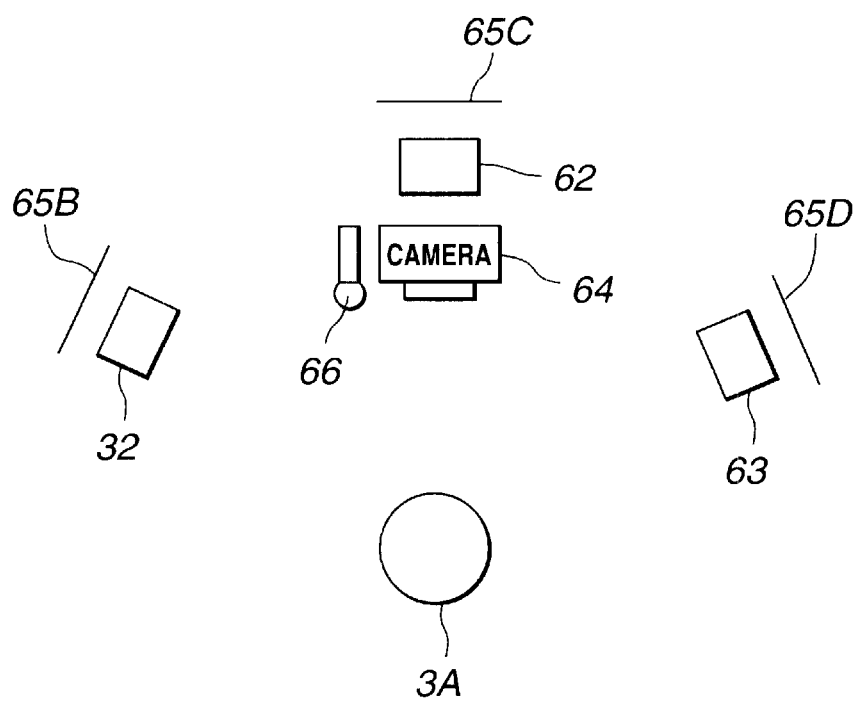
FIG. 36 is a block diagram showing a schematic structure in case where only sounds of conference attendants are communicated, as another example of a remote conference apparatus of the present invention.

Next, FIG. 36 shows another example of the structure of the remote conference apparatus 1A.

In this structural example shown in FIG. 36, image data of the other conference attendants 3B, 3C, and 3D are not communicated but only the sound data are communicated. Therefore, in the structural example in FIG. 36, loudspeakers 61, 62, and 63 for outputting sounds of the other conference attendants 3B, 3C, and 3D are provided as if the other conference attendants 3B, 3C, and 3D together with the conference attendant 3A sat around one table and had a conference together. Note that objects symbolizing the conference attendants 3B, 3C, and 3D, such as photos 65B, 65C, and 65D, are provided near the loudspeakers 61, 62, and 63 which output sound data of the conference attendants 3B, 3C, and 3D.

A camera 64 and a microphone 66 are provided, for example, in front of the conference attendant 3A, and image data of the conference attendant 3A picked up by the camera 64 and sound data of the conference attendant 3A collected by the microphone 66 are transmitted to the remote conference apparatuses 1B to 1D through the ISDN 2.

Sound data of the conference attendant 3B transmitted from the remote conference apparatus 1B is outputted as sound from the loudspeaker 61, sound data of the conference attendant 3C transmitted from the remote conference apparatus 1C is outputted as sound from the loudspeaker 62, and sound data of the conference attendant 3D transmitted from the remote conference apparatus 1D is outputted as sound from the loudspeaker 63.

Also, in this structural example shown in FIG. 36, sound data of the conference attendants 3B to 3D are adjusted individually as described above in correspondence with an attention level (parameter P(t)) on the basis of the direction in which the conference attendant 3A faces, detected with use of the image data of the conference attendant 3A picked up by the camera 64.

Though the present embodiment cites an example in which the direction detector section 15 is provided in the remote conference apparatus, it is possible to provide independently the direction detector section 15 in a network.

Also, the present embodiment cites specific examples in which the eye direction and the face direction are detected individually, it is possible to carry out detection of both directions simultaneously. In addition, though the present embodiment describes that adjustments of the sound volume, sound quality, and image quality are performed individually in the specific examples of adjustment corresponding to an attention level detection result, it is possible to carry out two or three of those adjustments in combination with each other.

Further, each processing described above can be is carried out by a computer program, for example. In this case, the computer program for carrying out each processing may be provided for users by network providing media, such as the internet, digital satellite commutations, and the like, in addition to providing media in form of information recording media, such as magnetic disks, CD-ROMs, DVDs, and the like.

Industrial Applicability

As described above, according to the communication apparatus and the communication method of the present invention, the eye direction or face direction of a user is detected with use of image data picked up, and the level of attention paid by the user is obtained from the detected eye direction or face direction of the user. Based on the attention level, voices and images of other users inputted from other communication apparatuses are adjusted individually, so a desired speech can be heard easily and a desired image can be watched also easily.

What is claimed is:

1. A first communication apparatus used in a communication system in which communication is made between three or more communication apparatuses, the first communication apparatus comprising:

a direction detector for detecting a direction a user faces from among a plurality of discrete directions, wherein each discrete direction corresponds to a location associated with another of said communication apparatuses;

attention level detector for detecting the user's level of attention toward, each direction of said plurality of discrete directions, based on a detection result from the direction detector;

a receiver for receiving information from the other of said communication apparatuses;

an output device for outputting the information received from the other of said communications apparatuses; and an adjusting section for adjusting the output information based on the user's level of attention directed to each direction among said plurality of discrete directions, wherein, when the direction detector detects that the user has continuously faced a, first direction for a first predefined length of time or longer, the attention level detector detects the user's attention, level as being high with respect to the first direction, and, when the direction detector detects that the user has faced a direction other than the first direction after the direction detector has detected the user continuously facing the first direction for the first predefined length of time or longer, the attention level detector detects the user's attention level with respect to the first direction as being less than high by a first amount.

2. The apparatus according to claim 1 wherein when the direction detector detects that the user has faced a direction other than said first direction for a second predefined length of time or longer, the attention level detector detects the user's attention level with respect to the first direction as being less than high by a second amount.

3. The apparatus according to claim 1, wherein, when the direction detector detects that the user has faced a direction other than the first direction after the direction detector has detected the user continuously facing the first direction for the first predefined length of time, the attention level detector gradually lowers the user's detected attention level with respect to the first direction in proportion to a length of time in which the direction detector has detected the user facing a direction other than the first direction.

4. The apparatus according to claim 3, wherein the attention level detector begins gradually lowering the user's attention level with respect to the first direction after a second predefined length of time has passed from the time when the direction detector detects the user facing a direction other than said first direction.

5. The apparatus according to claim 1, wherein the attention level detector detects an attention level of the user with respect to each direction of said, plurality of discrete directions.

6. The apparatus according to claim 5, wherein the adjusting section adjusts the output information based on the detected attention levels for each discrete direction.

7. The apparatus according to claim 1, wherein the direction detector detects a direction the user is facing by detecting an eye directions of the user.

8. The apparatus according to claim 1, wherein the adjusting section adjusts the output information corresponding to a direction for which, the user's attention level is high, such that the output information received from the communication apparatus associated with the direction with respect to which the user's attention level is high is emphasized relative to information received from other communication apparatuses.

9. The apparatus according to claim 1, further comprising a presentation section for presenting the adjusted output information to a user.

10. The apparatus according to claim 9, wherein the output information is audio information and the adjusting section adjusts audio information presented by the presentation section.

11. The apparatus according to claim 10, wherein the adjusting section adjusts audio volume of the audio information presented by the presentation section.

12. The apparatus according to claim 9, wherein the information is image information and the adjusting section adjusts the image information presented by the presentation section.

13. The apparatus according to claim 9, further comprising a plurality of presentation sections each corresponding to one of said plurality of discrete directions.

14. The apparatus according to claim 3, further comprising:

an obtaining means for obtaining information of the user; and a transmitter for transmitting the information of the user obtained by the obtaining means to the other communication apparatuses.

15. A first communication apparatus used in a communication system in which communication is made between three or more communication apparatuses, the first communication apparatus comprising:
- a direction detector for detecting a direction a user faces from among a plurality of discrete directions, wherein each discrete direction corresponds to a location associated with another of said communication apparatuses;
- an attention level detector for detecting the user's level of attention toward each direction of said plurality of discrete directions, based on a detection result from the direction detector;
- a receiver for receiving information from the other of said communication apparatuses;
- an output device for outputting the information received from the other of said communications apparatuses; and
- an adjusting section for adjusting the output information based on the user's level of attention directed to each direction among said plurality of discrete directions, wherein the direction detector detects a direction the user is facing by detecting a face direction of the user.

16. A first communication apparatus used in a communication system in which communication is made between three or more communication apparatuses, the first communication apparatus comprising:
- a direction detector for detecting a direction a user faces from among a plurality of discrete directions, wherein each discrete direction corresponds to a location associated with another of said communication apparatuses;
- an attention level detector for detecting the user's level of attention toward each direction of said plurality of discrete directions, based on a detection result from the direction detector;
- a receiver for receiving information from the other of said communication apparatuses;
- an output device for outputting the information received from the other of said communications apparatuses;
- an adjusting section for adjusting the output information based on the user's level of attention directed to each direction among said plurality of discrete directions; and
- a presentation section for presenting the adjusted output information to a user, wherein the output information is audio information and the adjusting section adjusts audio information presented by the presentation section, and wherein the adjusting section adjusts audio quality of the audio information presented by the presentation section.

17. A first communication apparatus used in a communication system in which communication is made between three or more communication apparatuses, the first communication apparatus comprising:
- a direction detector for detecting a direction a user faces from, among a plurality of discrete directions, wherein each discrete direction corresponds to a location associated with another of said communication apparatuses;
- an attention level detector for detecting the user's level of attention toward each direction of said plurality of discrete directions, based on a detection result from the direction detector;
- a receiver for receiving information from the other of said communication apparatuses;
- an output device for outputting the information received from the other of said communications apparatuses;
- an adjusting section for adjusting the output information based on the user's level of attention directed to each direction among said plurality of discrete directions; and
- a presentation section for presenting the adjusted output information to a user, wherein the information is image information and the adjusting section adjusts the image information presented by the presentation section, and wherein the adjusting section adjusts image quality information presented by the presentation section.

18. A communication method used for a communication system in which communication is made between three or more communication apparatuses, the method comprising the steps of:
- detecting a direction in which a user faces among a plurality of discrete directions, wherein each direction corresponds to a location associated with, one of the communication apparatuses;
- detecting a user's attention level with respect to the plurality of directions based on a detection result in the direction detecting step;
- adjusting information received from the communication apparatuses according to the level of attention directed by the user to each respective direction, wherein the attention level detecting step further comprises determining a first direction in which the user has continuously faced for a first predetermined length of time or longer, and determining that the attention level of the user is high with respect to the first direction; and
- lowering the determined attention level of the user with respect to the first direction upon detecting the user facing a direction other than the first direction after having determined that the user had faced the first direction continuously for said first predefined length of time or longer.

19. The method according to claim 18, wherein the step of lowering the determined attention level of the user with respect to the first direction is performed after detecting that the user has faced a direction other than the first direction for a second predetermined length of time.

20. The method according to claim 18, wherein the step of lowering the determined attention level of the user with respect to the first direction is performed gradually in response to a length of time in which it is determined that the user is facing a direction other than said first direction.

21. The a method according to claim 20, wherein the step of gradually lowering the determined attention level is performed after detecting that the user has faced a direction other than the first direction for a second predetermined length of time.

22. The method according to claim 18, wherein the step of detecting a user's attention level comprises detecting said user's attention level for each of said plurality of directions.

23. The method according to claim 22, wherein the step of adjusting information is performed based on the attention levels for each direction respectively.

24. The method according to claim 18, wherein the step of detecting a direction comprises detecting a user's eye direction.

25. The method according to claim 18, wherein in the adjusting information step, information corresponding to the direction in which the attention level is high is adjusted to be emphasized relative to other information.

26. The method according to claim 18, further comprising the step of presenting the information adjusting step to a user.

27. The method according to claim 26, wherein
the information is image information, and
wherein the step of adjusting information comprises adjusting image information presented in the presentation step.

28. The method according to claim 26, wherein the presentation step comprises performing a plurality of presentations corresponding to each of the plurality of directions.

29. The method according to claim 18, wherein the step of adjusting comprising adjusting sound information to be presented in the prevention step.

30. The method according to claim 29, wherein the volume of sound information presented in the presentation step is adjusted.

31. The method according to claim 18, further comprising the steps of:

obtaining information of the user, and transmitting the obtained information of the user to the other communication apparatuses.

32. A communication method used for a communication system in which communication is made between three or more communication apparatuses, the method comprising the steps of:

detecting a direction in which a user faces among a plurality of discrete directions, wherein each direction corresponds to a location associated with one of the communication apparatuses;

detecting a user's attention level with respect to the plurality of directions based on a detection result in the direction detecting step; and adjusting information received from the communication apparatuses according to the level of attention directed by the user to each respective direction, wherein the step of detecting a direction comprises detecting a user's face direction.

33. A communication method used for a communication system in which communication is made between three or more communication apparatuses, the method comprising the steps of:

detecting a direction in which a user faces among a plurality of discrete directions, wherein each direction corresponds to a location associated with one of the communication apparatuses;

detecting a user's attention level with respect to the plurality of directions based on a detection result in the direction detecting step;

adjusting information received from the communication apparatuses according to the level of attention directed by the user to each respective direction; and presenting the information adjusted in the adjusting step to a user, wherein the step of adjusting comprises adjusting sound information to be presented in the presentation step, and wherein the quality of the sound information presented in the presentation step is adjusted.

34. A communication method used for a communication system in which communication is made between three or more communication apparatuses, the method comprising the steps of: detecting a direction in which a user faces among a plurality of discrete directions, wherein each direction corresponds to a location associated with one of the communication apparatuses;

detecting a user's attention level with respect to the plurality of directions based on a detection result in the direction detecting step;

adjusting information received from the communication apparatuses according to the level of attention directed by the user to each respective direction; and presenting the information adjusted in the adjusting step to a user, wherein the information is image information, wherein the step of adjusting information comprises adjusting image information presented in the presentation step, and wherein the quality of the image information presented in the presentation step is adjusted.

* * * * *